US007420886B2

(12) United States Patent
Tomiyasu et al.

(10) Patent No.: US 7,420,886 B2
(45) Date of Patent: Sep. 2, 2008

(54) MAGNETIC RECORDING MEDIUM, AND THERMAL STABILITY MEASURING METHOD AND APPARATUS OF MAGNETIC RECORDING MEDIUM

(75) Inventors: Hiroshi Tomiyasu, Tokyo (JP);
Teiichiro Umezawa, Tokyo (JP);
Genshichi Hata, Tokyo (JP); Takashi Morikawa, Tokyo (JP); Masato Kobayashi, Tokyo (JP); Masashi Suzuki, Singapore (SG); Satoshi Yokota, Singapore (SG); Tsuyoshi Watanabe, Singapore (SG)

(73) Assignee: Hoya Corporation (JP)

( * ) Notice: Subject to any disclaimer, the term of this patent is extended or adjusted under 35 U.S.C. 154(b) by 0 days.

(21) Appl. No.: 11/788,426

(22) Filed: Apr. 20, 2007

(65) Prior Publication Data
US 2007/0248844 A1     Oct. 25, 2007

Related U.S. Application Data

(62) Division of application No. 09/540,646, filed on Mar. 31, 2000, now Pat. No. 7,220,500.

(30) Foreign Application Priority Data

Mar. 31, 1999  (JP)  .............................. 1999/93905
Mar. 31, 1999  (JP)  .............................. 1999/94386
Mar. 31, 1999  (JP)  .............................. 1999/94391

(51) Int. Cl.
*G11B 11/00*      (2006.01)
*G11B 5/66*       (2006.01)

(52) U.S. Cl. .............................. 369/13.17; 360/324.12; 428/831

(58) Field of Classification Search .............. 369/13.17, 369/13.2, 275.1–275.5, 288, 59.1, 116, 53.2, 369/47.1, 47.15; 360/324.12; 428/831, 811.2, 428/811.5, 831.2, 832.3, 141, 336, 680
See application file for complete search history.

(56) References Cited

U.S. PATENT DOCUMENTS 6,057,021 A       5/2000   Ishikawa et al.
6,307,817 B1 *   10/2001   Tsuboi ..................... 369/13.17
6,403,240 B1      6/2002   Kanbe et al.
6,562,488 B1      5/2003   Chen et al.

FOREIGN PATENT DOCUMENTS

JP           11-39653          2/1999

OTHER PUBLICATIONS

Lee, L.-L. et al, "Effects of Cr Intermediate Layers on CoCrPt Thin Film Media on NiAl Underlayers," IEEE Transactions on Magnetics, vol. 31, No. 6, Nov. 1995, pp. 2728-2730.

* cited by examiner

*Primary Examiner*—Ali Neyzari
(74) *Attorney, Agent, or Firm*—Cook Alex Ltd.

(57) ABSTRACT

There is disclosed a magnetic recording medium in which a seed layer, under layer, intermediate layer, first magnetic layer, nonmagnetic layer, second magnetic layer, protective layer, and lubricant layer are successively laminated on a glass substrate, the nonmagnetic layer is constituted of an alloy containing Cr and C, and the magnetic layer is constituted of an alloy containing Co and Pt. The under layer includes at least the seed layer for finely dividing the crystal particles of the magnetic layer, the seed layer includes at least two or more layers of nonmagnetic films, and the intermediate layer formed of the material different from that of the nonmagnetic film is interposed between the nonmagnetic films. In measurement of the thermal stability of the magnetic recording medium, a head is used, the head includes a read/write element, and a write track width is twice or more as large as a read track width in the head.

3 Claims, 9 Drawing Sheets

TABLE 1

| | LAYER THICKNESS (Å) | COERCIVE FORCE (Oe) | S/N RATIO (dB) | PW50(nsec) | dB / DECADE | Ku·V / kT |
|---|---|---|---|---|---|---|
| EXAMPLE 2 | 5 | 2350 | 28.0 | 22.3 | -0.070 | 95 |
| EXAMPLE 3 | 10 | 2250 | 28.8 | 22.6 | -0.073 | 90 |
| EXAMPLE 4 | 50 | 2250 | 29.4 | 23.3 | -0.083 | 90 |
| EXAMPLE 5 | 100 | 2120 | 29.2 | 23.4 | -0.090 | 85 |
| COMPARATIVE EXAMPLE 2 | 3 | 2550 | 27.7 | 21.6 | -0.060 | 100 |
| COMPARATIVE EXAMPLE 3 | 120 | 2000 | 29.1 | 23.6 | -0.100 | 80 |

FIG. 2

TABLE 2

| | NONMAGNETIC LAYER COMPOSITION | COERCIVE FORCE (Oe) | S/N RATIO (dB) | PW50(nsec) | dB / DECADE | Ku·V / kT |
|---|---|---|---|---|---|---|
| EXAMPLE 6 | $CrMn_{0.5}C_{0.01}$ | 2130 | 29.0 | 22.8 | -0.077 | 92 |
| EXAMPLE 7 | $CrMn_5C_{0.01}$ | 2400 | 29.5 | 23.3 | -0.080 | 90 |
| EXAMPLE 8 | $CrMn_2C_{0.1}$ | 2350 | 29.3 | 23.0 | -0.082 | 88 |
| EXAMPLE 9 | $CrMn_2C_{0.5}$ | 2150 | 29.6 | 22.5 | -0.080 | 90 |
| EXAMPLE 10 | $CrC_{0.2}$ | 2080 | 29.1 | 22.2 | -0.085 | 88 |
| COMPARATIVE EXAMPLE 4 | $CrMn_2$ | 2370 | 28.7 | 23.6 | -0.095 | 80 |
| COMPARATIVE EXAMPLE 5 | $CrMn_2C_{0.55}$ | 2090 | 29.6 | 22.5 | -0.092 | 83 |
| COMPARATIVE EXAMPLE 6 | $CrMn_{0.4}C_{0.01}$ | 2070 | 29.0 | 22.8 | -0.100 | 78 |
| COMPARATIVE EXAMPLE 7 | $CrMn_6C_{0.01}$ | 2350 | 29.7 | 23.6 | -0.097 | 88 |

FIG. 3

|  | OUTPUT ATTENUATION (dB / DECADE) |
|---|---|
|  | (100kfci, 60°C) |
| SAMPLE A | 0.095 |
| SAMPLE B | 0.129 |
| SAMPLE C | 0.081 |

MAGNETIC RECORDING MEDIUM, AND THERMAL STABILITY MEASURING METHOD AND APPARATUS OF MAGNETIC RECORDING MEDIUM

This application is a divisional of U.S. application Ser. No. 09/540,646 filed Mar. 31, 2000 now U.S. Pat. No. 7,220,500.

BACKGROUND OF THE INVENTION

1. Field of the Invention

The present invention relates to magnetic recording media such as a hard disk mounted on a computer, and the like, particularly to a magnetic recording medium which has a high coercive force and which inhibits the generation of noises during regeneration of a recording signal.

The present invention also relates to a method and apparatus for accurately measuring and evaluating a signal decay by the thermal fluctuation of a magnetic recording medium in a simple method before the magnetic recording medium is incorporated into a magnetic storage apparatus.

2. Description of the Related Arts

As this kind of magnetic recording medium, for example, such a magnetic recording medium as described in Japanese Patent Application Laid-Open No. 227516/1996 is suggested. This magnetic recording medium comprises a basic constitution wherein two Co—Pt-based magnetic layers are disposed on a substrate and a non-magnetic layer containing Cr and Mo as main components is interposed between these two magnetic layers. When the magnetic layer is divided into two layers with the non-magnetic layer in this way, noise can be reduced in replaying a recorded signal, because the film thickness of each magnetic layer is thinner than that of a single magnetic layer which is equal to the total film thickness of the three layers. On the other hand, for the purpose of reducing the noise, there is suggested a magnetic recording medium employing a constitution in which an inter-metallic compound of a B2 structure is used as an underlayer, as described in U.S. Pat. No. 5,693,426. This inter-metallic compound of the B2 structure is generally called a seed layer. In this case, the fine seed layer of the B2 structure is further formed as a lower layer under a Cr-based underlayer which is compatible with a Co-based magnetic layer, whereby the Cr-based layer which is the underlayer can be allowed to carry out epitaxial growth. In consequence, the fine Cr-based underlayer can be formed, and the magnetic layer present on the underlayer can also be allowed to do the epitaxial growth in accordance with the fine state of the underlayer, which permits the reduction of the noise. Such a type of magnetic recording medium can be suitably used as the magnetic recording medium for MR (magnetism-resistant type) heads in which the inhibition of the noise is more desired than the increase of an output.

In the magnetic recording medium comprising the constitution described above, the magnetic layers are divided with the non-magnetic layer, and hence each magnetic layer is surely thin and the particle size of crystals is small, whereby the noise can be inhibited. In addition, the particle diameter of the crystals of the magnetic layer can be decreased by the epitaxial growth of an upper layer due to the seed layer, whereby the noise can also be inhibited. However, if the crystals of the magnetic layer are made very fine for the purpose of the reduction of the noise, magnetization is thermally unstable, and a recorded signal attenuates with time and finally it disappears. Accordingly, as the fine structure of the medium suitable for high density recording, it is important that the fine particles are formed, a particle diameter distribution is uniformed, the dispersion of a particle size is minimized, and the formation of the extremely fine particles which are easily affected by thermal fluctuation is inhibited.

Moreover, as this type of magnetic recording medium, for example, a magnetic recording medium described, for example, in Japanese Patent Application Laid-Open No. 259418/1997 is proposed. The magnetic recording medium is formed by laminating a seed layer consisting of at least $Al_{1-x}Co_x$, and the like, a Cr or Cr alloy under film, and a Co alloy magnetic layer in this order on a substrate, and a high coercive force and low noise are achieved.

For the high coercive force in the magnetic recording medium, the seed layer enhances the crystal orientation property of surface (110) in a body-centered cubic crystal (bcc) of Cr or Cr alloy as the under film, and the crystal orientation property of surface (100) is enhanced and achieved, in which the easy axis of magnetization (c-axis) of the Co magnetic layer epitaxially grown on the under film is parallel with the inside of the plane.

Moreover, in this magnetic recording medium, since the thickness of the under film can be reduced by disposing the seed layer, the Co magnetic particles on the thinned under film are formed to be fine, so that the magnetic transition region (magnetic domain wall width) between recording bits can be reduced, and noises can be reduced.

Moreover, when the crystal particle diameter of the magnetic layer becomes very fine so as to reduce the noises, the magnetization becomes thermally unstable, thereby causing a phenomenon in which recorded signals are attenuated with time and finally disappear, that is, a phenomenon called thermal fluctuation. The noise has a trade-off relationship with the thermal fluctuation. When the crystal particle diameter of the magnetic layer becomes fine, the noises are reduced, but the signal attenuation by the thermal fluctuation increases, and the recorded signals are attenuated or easily disappear with the elapse of time. When the thermal fluctuation occurs, in addition to the signal attenuation (readback output decrease), the medium noise increases, or PW50 (the half pulse width of an isolated readback signal) value is deteriorated.

As described later, as the fine structure of the medium preferable for high-density recording, with the attaining of the fine magnetic layer crystal particles, it becomes important to reduce the dispersion of the particle size (particle diameter distribution) and to depress the generation of the excessively fine particles susceptible to the influence of the thermal fluctuation.

However, when the film thickness of the seed layer is increased to obtain a high coercive force, the crystal particle diameter and particle diameter distribution forming the seed layer increase, and the crystal particle diameter and particle diameter distribution of the under film and magnetic layer formed on the seed layer also increase with the crystal growth, thereby causing a problem that the noise reduction cannot be realized.

On the other hand, in recent years, the computer performance enhancement has been advanced, and the amount of handled information has rapidly increased. Accordingly, the capacity of the magnetic recording apparatus, particularly a hard disk drive has increased steadily.

For the hard disk drive, in recent years, with the enhancement of the recording density, the phenomenon called as the thermal fluctuation has come into question. In this phenomenon, the signal written to the magnetic recording medium is attenuated with the elapse of time. The cause for this is said to be that the magnetization becomes thermally unstable by the fine division of the magnetic particles. Therefore, this attenuation is particularly remarkable under a high-temperature environment. Therefore, in order to evaluate the magnetic recording medium, the above-described signal attenuation needs to measured under the high-temperature environment to evaluate whether or not the thermal fluctuation properties are satisfactory.

However, in a conventional spin stand type electromagnetic conversion property evaluating apparatus, since the apparatus is large scaled for the volume of an environmental tank, it is difficult to place the magnetic recording medium in a high-temperature state.

Moreover, an off-track phenomenon called a thermal off-track occurs during the measurement under high temperatures, in which a head deviates from a track by the thermal expansion of a head suspension. Since the signal attenuation occurs with the occurrence of the thermal off-track, it is difficult to accurately measure and evaluate only the signal attenuation by the thermal fluctuation of the magnetic recording medium.

SUMMARY OF THE INVENTION

The present invention has been developed under the above-described background, and a first object thereof is to provide a magnetic recording medium which satisfies a high coercive force, high S/N ratio, low PW50 value and thermal fluctuation resistance.

Moreover, a second object of the present invention is to provide a magnetic recording medium which achieves a high coercive force and a low noise and which is not easily influenced by thermal fluctuation.

Furthermore, a third object of the present invention is to provide a method and apparatus for remarkably accurately measuring and evaluating the signal attenuation by the thermal fluctuation of a magnetic recording medium.

As a result of intensive studies, the present inventors have found that the cause of insufficient S/N ratio, PW50 value and thermal fluctuation resistance lies in the material of a crystal particle diameter control layer for controlling the crystal particle diameter and particle diameter distribution of the magnetic layer, and have clarified that only a specific alloy can attain a high S/N ratio, low PW50 value and high thermal fluctuation resistance. It has been found that particularly in the magnetic recording medium including two or more magnetic layers, and at least one nonmagnetic layer between at least one pair of magnetic layers, the cause lies in the film material of the nonmagnetic layer for separating the magnetic layers, and it has been clarified that when the magnetic layer uses Co—Pt base, only the specific alloy can attain the high S/N ratio, low PW50 value and high thermal fluctuation resistance. The present invention has been developed under this background, and employs the following constitutions to solve the problems.

According to the present invention, there is provided a magnetic recording medium including at least a magnetic layer on a substrate. The magnetic recording medium comprises, between the substrate and the magnetic layer, a crystal particle diameter control layer for controlling the crystal particle diameter and particle diameter distribution of the magnetic layer, and the crystal particle diameter control layer is an alloy containing chromium (Cr) and carbon (C).

In the present invention, the crystal particle diameter control layer is an alloy containing Cr and C. The effect of addition of carbon (C) to Cr is that since carbon (C) finely divides the Cr layer, the fine division of Co particles growing on the crystal particle diameter control layer is promoted and the crystal particle diameter distribution is enhanced. This reduces the fine particles excessively poor in thermal fluctuation resistant properties, improves the S/N ratio and PW50 value, and also enhances the thermal fluctuation resistant properties.

The content of carbon (C) in the crystal particle diameter control layer is preferably in a range of 0.01 at % to 0.5 at %. When the content of carbon (C) is smaller than 0.01 at %, the effect of finely dividing the crystal particle diameter control layer is deteriorated, the crystal particle diameter of the magnetic layer formed on the control layer increases, the high S/N ratio cannot be obtained, the particle diameter distribution cannot be uniformed, and the thermal fluctuation resistant properties are undesirably deteriorated. Moreover, when the content of carbon (C) exceeds 0.5 at %, the high coercive force cannot undesirably be obtained.

Furthermore, manganese (Mn) may be added to the crystal particle diameter control layer. Particularly, when the magnetic layer is directly formed on the crystal particle diameter control layer, Mn contained in the crystal particle diameter control layer is deposited in the interface of Co and Cr of the magnetic layer, and selectively deposited in the Cr phase of the initial Co layer which grows on the Cr alloy layer, so that the magnetic interaction among Co particles is reduced. This further improves the S/N ratio. Therefore, by appropriately adding these elements, both the PW50 value and the S/N ratio can be improved. The content of manganese (Mn) is preferably in a range of 0.5 at % to 5 at %. This is because in the case of a content of less than 0.5 at %, the effect of diffusion of Mn to the Co interface of the magnetic layer cannot be expected, and the S/N ratio cannot be improved. When the content exceeds 0.5 at %, the diffusion effect of Mn to the Co interface of the magnetic layer is large, the magnetic interaction among the Co particles is excessively weakened, and as a result, particularly the signal attenuation is deteriorated. Moreover, the constitution may further contain at least one element selected from molybdenum (Mo), vanadium (V), tungsten (W), zirconium (Zr), titanium (Ti), tantalum (Ta), nickel (Ni), niobium (Nb), oxygen (O) and nitrogen (N). This is caused by the following reasons. In order to attain a high recording density, in recent years, the magnetic disk has been requested to have a further high coercive force. To attain the high coercive force, the concentration of Pt contained in the Co-based alloy of the magnetic layer tends to increase, and the lattice constant of the Co-based alloy accordingly increases. To cause the epitaxial growth of the under layer and magnetic layer, the lattice constant of the under layer needs to match with that of the magnetic layer, not excepting the crystal particle diameter control layer. Therefore, among the above-described elements, Mo, V, W, Zr, Ti, Ta, Ni, Nb, and the like have a larger atomic radius than that of Cr contained in the crystal particle diameter control layer, and have a function of matching the lattice constant with that of the magnetic layer. On the other hand, oxygen or nitrogen inhibits the grain growth, and finely divides crystal particles. By effectively using these two types of methods, the magnetic recording medium is provided with a further high coercive force, high S/N ratio, low PW50 value, and satisfactory thermal fluctuation resistance. In this case, the content of the element or the total of the elements is in a range of 2 at % to 30 at %. This is because with the content of less than 2 at %, the lattice constant of the Cr alloy becomes smaller than that of the Co-based alloy of the magnetic layer, and with the content exceeding 30 at %, conversely, the constant becomes excessively large. In either case, the epitaxial growth of the magnetic layer becomes difficult, and the coercive force and S/N ratio are deteriorated.

The material of the substrate is not particularly limited. For example, a glass substrate, a crystallized glass substrate, an aluminum alloy substrate, a ceramics substrate, a carbon substrate, a silicon substrate, and the like can be used.

The magnetic layer of the magnetic recording medium of the present invention may comprise a single layer or a plurality of layers. In the plurality of layers, the magnetic layer may directly be laminated on the magnetic layer, or the nonmagnetic layer may be interposed between the magnetic layers. According to seventh to tenth aspects of the present invention, the magnetic recording medium includes two or more magnetic layers. The number of magnetic layers can be set to two or more, such as three, four, and five, in consideration of readback outputs, overwriting properties, and the like. However, from the standpoint of practical use, about five layers at maximum are usually laminated. However, six or more magnetic layers may of course be disposed as occasion demands.

According to the seventh to tenth aspects of the present invention, the magnetic recording medium includes a nonmagnetic layer between at least one pair of magnetic layers in two or more magnetic layers. The nonmagnetic layer is usually disposed directly between the magnetic layers. Additionally, the intermediate layer can be disposed between the nonmagnetic layer and the magnetic layer. Moreover, when there are three or more magnetic layers, the nonmagnetic layer is preferably formed between the respective pairs of magnetic layers. In this case, when the number of magnetic layers is n, n−1 nonmagnetic layers are disposed. However, when there are three or more magnetic layers, the nonmagnetic layer is not disposed between all pairs of magnetic layers, and the nonmagnetic layer may be disposed between at least one pair of the magnetic layers as occasion demands.

The thickness of each magnetic layer is appropriate in a range of 50 to 250 angstroms, preferably 80 to 150 angstroms. This is because for the magnetic layer with a thickness of less than 50 angstroms, the readback output shortage, coercive force decrease, and thermal fluctuation property deterioration are caused, and with the thickness exceeding 250 angstroms, the magnetic layer grain increases with the increase of the film thickness, thereby deteriorating (lowering) the S/N ratio, and PW50 value. Moreover, the thickness of each nonmagnetic layer is appropriate in a range of 5 to 10 angstroms, preferably 10 to 50 angstroms. This is because for the nonmagnetic layer with a thickness of less than 5 angstroms, the magnetic separating effect of the magnetic layers formed on and under the nonmagnetic layer is not expected, and the S/N ratio is not improved. When the thickness exceeds 100 angstroms, the magnetic separation of the magnetic layers formed on and under the nonmagnetic layer is excessively performed, and the coercive force and thermal fluctuation properties are deteriorated.

For the film constitution of the magnetic layer, in addition to the constitution shown in the following embodiment of magnetic layer-nonmagnetic layer-magnetic layer, for example, the number of magnetic layer films may further be increased, such as magnetic layer-nonmagnetic layer-magnetic layer-magnetic layer-nonmagnetic layer-magnetic layer. Moreover, in two or more magnetic layers, the material and film thickness constituting the respective magnetic layers may be the same or different. Similarly in two or more nonmagnetic layers, the material and film thickness constituting the respective nonmagnetic layers may be the same or different In the present invention, the material of the magnetic layer is not limited. For example, an alloy mainly containing Co and Pt, an alloy mainly containing Co and Ni, an alloy mainly containing Co and Cr, and the like are used. Specifically, CoPt, CoNi, CoCr, CoPtCr, CoPtTa, CoPtNi, CoNiCr, CoCrTa, CoCrPtTa, CoCrPtB, CoCrPtTaNb, CoCrPtBNb, and the like can be exemplified. Additionally, the magnetic layer of the magnetic recording medium for a magnetoresistive head, or the magnetic layer of the magnetic recording medium with a high coercive force may comprise an alloy mainly containing Co and Pt. For the alloy mainly containing Co and Pt, from the standpoint of a sufficient coercive force, the total of Co and Pt is appropriately 70 at % or more in the alloy. Moreover, the ratio of Co and Pt is not particularly limited, but in consideration of the coercive force, noise and cost, Pt (at %)/Co (at %) is appropriate in a range of 0.06 to 0.25.

The components other than Co and Pt are not especially limited, but one or two or more can appropriately be used, for example, from Cr, Ta, Ni, Si, B, O, N, Nb, Mn, Mo, Zn, W, Pb, Re, V, Sm and Zr. The addition amount of these elements is appropriately be determined by considering the magnetic properties, and the like, and 30 at % or less is usually appropriate. Concrete examples of the magnetic layer material include a CoPtCr alloy, a CoPtTa alloy, a CoPtCrTa alloy, a CoPtCrNi alloy, a CoPtCrB alloy, and the like.

From the standpoint of the noise reduction, when the magnetic layer comprises the CoPtCr alloy, for the preferable contents of Co, Pt, Cr, Co: 62 to 90 at %, Pt: 5 to 20 at %, and Cr: 5 to 18 at %. Moreover, in the CoPtCrTa alloy, for the preferable contents of Co, Pt, Cr, Ta, Co: 55 to 89 at %, Pt: 5 to 20 at %, Cr: 5 to 25 at %, and Ta: 1 to 7 at %, whereas in the CoPtCrB alloy, for the preferable contents of Co, Pt, Cr, B, Co: 46 to 89 at %, Pt: 5 to 17 at %, Cr: 5 to 25 at %, B: 1 to 12 at %.

Moreover, from the standpoint of the high coercive force, the saturation magnetic flux density Bs of the magnetic layer on the side of the substrate is preferably larger than the saturation magnetic flux density Bs of the magnetic layer on the side of the medium surface. The magnetic layer on the side of the substrate is considered to mainly determine the coercive force of the magnetic recording medium, and a high saturation magnetic flux density Bs is demanded. Moreover, the magnetic layer on the side of the medium surface is considered to mainly determine the S/N ratio and corrosion-resistant properties of the magnetic recording medium, and a small saturation magnetic flux density Bs is demanded. In this case, for the preferable composition range of the magnetic layer of CoPtCrTa, the substrate-side magnetic layer preferably contains Co: 59 to 81 at %, Pt: 5 to 13 at %, Cr: 13 to 23 at %, and Ta: 1 to 5 at %, while the medium surface-side magnetic layer preferably contains Co: 57 to 79 at %, Pt:5 to 13 at %, Cr: 15 to 25 at %, and Ta: 1 to 5 at %.

In the present invention, the nonmagnetic layer is an alloy containing Cr and C. For the effect of the addition of C to Cr, since C makes the Cr layer to be fine, fine Co particles growing thereafter are obtained, and the particle diameter distribution is enhanced. This reduces fine particles which are excessively poor in thermal fluctuation resistant properties, improves the S/N and PW, and enhances the thermal fluctuation resistant properties. Additionally, Mn is deposited in the interface of the interface of the Co and Cr layers, and selectively deposited in the Cr phase of the initial Co layer which grows on the Cr alloy layer, so that the magnetic interaction among Co particles is reduced. This improves the S/N ratio. Therefore, by appropriately adding these elements, both the PW and the S/N can be improved.

In addition to the magnetic layer and the nonmagnetic layer, the magnetic recording medium of the present invention can include a seed layer, an under layer, a protective layer, a lubricant layer, and the like. Known layers can be used as they are in the seed layer, under layer, intermediate layer, protective layer and lubricant layer.

The seed layer is usually constituted of the material small in crystal particle diameter and uniform in crystal particles, and disposed for the purpose of enhancing the crystal growth while keeping the crystal particles of the under layer, intermediate layer, and magnetic layer formed on the seed layer to be fine. Examples of the representative material of the seed layer include an NiAl alloy and other materials with a B2 type crystal structure, a CrTi alloy, a CrNi alloy, and the like. Additionally, in order to enhance the crystal growth, the seed layer may be laminated.

The under layer may preferably be formed of a material from Which a high coercive force can be obtained. The under layer can be constituted of one layer or two or more layers. As the under layer, for example, a CrMo alloy, a CrV alloy, a CrW alloy, and the like can be used. By using the Cr alloy in this manner, the matching of the lattice surface interval of the magnetic layer and the under layer is enhanced, so that the easy axis of magnetization of the magnetic layer easily turns into the surface. As a result, the in-plane coercive force and the electromagnetic properties are enhanced. Moreover, when the under layer has the same coercive force as that of Cr, the film thickness of the Cr alloy can be reduced, and the excessive increase of the particle diameter/size by the increase of the film thickness of the Cr alloy can be depressed, so that the PW and S/N ratio can be enhanced as a result.

The intermediate layer is formed between the under layer and the magnetic layer, preferably in the position which abuts on the magnetic layer, and is disposed for the purpose of enhancing the orientation of C-axis of the magnetic layer. The intermediate layer comprises a nonmagnetic material, and its crystal system is preferably adapted to that of the magnetic layer. In the CoPt-based magnetic layer as in the present invention, since an HCP crystal structure including a hexagonal closest packing crystal structure is constructed, the intermediate layer is provided with the HCP crystal structure. As the intermediate layer including the HCP crystal structure, CoCr, CoCrNb, CoCrPt, CoCrPtTa, and other alloys can be exemplified. The protective layer is disposed on the magnetic layer (on the surface opposite to the substrate) for the purpose of protecting the magnetic layer from the destruction by head contact sliding. The protective layer can be constituted of one layer or two or more layers.

Examples of the protective layer include a silicon oxide film, a carbon film, a zirconia film, a hydrocarbon film, a hydrocarbon nitride film, a carbon nitride film, a silicon nitride film, an SiC film, and the like. Additionally, the protective layer can be disposed by known film forming methods such as sputtering. The lubricant layer is disposed for the purpose of reducing the resistance by the contact sliding with the head, and for example, perfluoropolyether, and the like are usually used.

Additionally, the crystal particle diameter control layer of the present invention is formed may be formed anywhere between the substrate and the magnetic layer. For example, the layer is formed between the substrate and the seed layer. When the seed layer comprises a plurality of layers, the control layer is formed between the seed layers, between the seed layer and the under layer, between the seed layer and the magnetic layer, or between the substrate and the under layer. When the magnetic layer comprises a plurality of layers, the control layer is formed between the magnetic layers, or the like. Specifically, there are exemplified substrate/crystal particle diameter control layer/seed layer, substrate/seed layer/crystal particle diameter control layer/seed layer, substrate/seed layer/crystal particle diameter control layer/under layer, substrate/seed layer/crystal particle diameter control layer/magnetic layer, substrate/crystal particle diameter control layer/under layer/(intermediate layer)/magnetic layer, magnetic layer/crystal particle diameter control layer/magnetic layer, and the like.

Furthermore, as a result of intensive studies, the present inventors have found that the reason why the high coercive force, low noise and thermal fluctuation resistance cannot sufficiently be satisfied lies in the structure of the seed layer, and have clarified that the above-described objects can be attained by changing the structure of the seed layer. The present invention has been developed under the background, and the following constitutions are employed.

(Constitution 1) In a magnetic recording medium in which at least an under layer, and a magnetic layer are formed in this order on a substrate, the under layer includes at least a seed layer for finely dividing crystal particles of the magnetic layer, the seed layer includes two or more layers of nonmagnetic films, and an intermediate layer formed of a material different from that of the nonmagnetic film is interposed between the nonmagnetic films.

(Constitution 2) The under layer for adjusting the crystal orientation of the magnetic layer is formed between the seed layer and the magnetic layer.

(Constitution 3) In the magnetic recording medium according to the constitution 1 or 2, the thickness of the nonmagnetic film is in a range of 100 to 550 angstroms.

(Constitution 4) In the magnetic recording medium according to any one of the constitutions 1 to 3, the film thickness of the intermediate layer is in a range of 5 to 50 angstroms.

(Constitution 5) In the magnetic recording medium according to any one of the constitutions 1 to 4, the intermediate layer comprises a nonmagnetic material which includes the same crystal structure as that of the nonmagnetic film.

(Constitution 6) In the magnetic recording medium according to the constitution 5, the intermediate layer comprises a material in which a crystal lattice surface interval does not match with that of the nonmagnetic film.

(Constitution 7) In the magnetic recording medium according to the constitution 6, the nonmagnetic film comprises the material containing one alloy selected from a group consisting of NiAl, AlCo, FeAl, FeTi, CoFe, CoTi, CoHf, CoZr, NiTi, CuZn, ALMn, AiRe, AgMg, CuSi, NiGa, CuBe, MnV, NiZn, FeV, CrTi, CrNi, NiAlRu, NiAlW, NiAlTa, NiAlHf, NiAlMo, NiAlCr, NiAlZr, NiAlNb, and $Al_2FeMn_2$, and the intermediate layer comprises the material containing Cr.

(Constitution 8) In the magnetic recording medium according to the constitution 7, the intermediate layer comprises a material formed of Cr and at least one type selected from a group consisting of Mo, V, W, and Ta.

(Constitution 9) In the magnetic recording medium according to the constitution 8, the intermediate layer comprises an alloy mainly containing Cr and W.

According to the constitution 1, the under layer includes at least the seed layer for finely dividing the crystal particles of the magnetic layer, the seed layer includes at least two or more layers of nonmagnetic films, and the intermediate layer comprising the material different from that of the nonmagnetic film is interposed between the nonmagnetic films. Therefore, the nonmagnetic film is an initial growth film with a small crystal particle diameter, and the crystal particle diameter of the under film and/or the magnetic layer formed on the nonmagnetic film is reduced, so that the magnetic transition region (magnetic domain wall width) can be reduced and uniformed, and noises are reduced. Moreover, for the coercive force, by setting the total of the thickness of the alloy films constituting the seed layer to be the same as the film thickness of the seed layer constituted of the single layer of the alloy film, the high coercive force is maintained. Furthermore, by interposing the intermediate layer between the nonmagnetic films, the particle diameter distribution of the nonmagnetic film formed on the seed layer is reduced. When the under film and the magnetic layer are formed, the particle diameter distribution of the under film and magnetic layer is also reduced. Moreover, when no under film is formed, the particle diameter distribution of the magnetic layer is also reduced. Therefore, the generation of excessively fine particles susceptible to the influence of the thermal fluctuation can be suppressed, and the influence of the thermal fluctuation can be avoided. Specifically, as shown in FIG. 4, the conventional magnetic recording medium (curve B) disclosed in the Japanese Patent Application Laid-Open No. 259418/1997 includes the excessively fine particles (part B1) susceptible to the influence of the thermal fluctuation. On the other hand, in the present invention (curve A), since the excessively fine particles susceptible to the influence of the thermal fluctuation decrease (B1→A1), the influence of the thermal fluctuation is not easily exerted. Moreover, in the present invention (curve A), since the particle diameter distribution is narrowed, the average particle diameter is reduced (B3→A3), and the particles with large particle diameters are reduced (B2→A2), the S/N ratio and PW50 (the mesial magnitude width of the isolated regeneration signal) are enhanced.

Additionally, the nonmagnetic film constituting the seed layer is constituted of two or more layers. The number of nonmagnetic films can be set to two or more, such as three, four, or five, in consideration of the readback outputs, overwriting properties, and the like. Additionally, about three layers at maximum are usually preferable from the practical standpoint. Moreover, for the seed layer of the present invention, the intermediate layer is interposed between at least one pair of nonmagnetic films among two or more layers of the nonmagnetic films. The intermediate layer has a function of temporarily interrupting the crystal growth of the nonmagnetic film. When there are three or more layers of nonmagnetic films, the intermediate layer is preferably disposed between the respective nonmagnetic films. In this case, when the number of layers of nonmagnetic films is n, n–1 intermediate layers are disposed. When there are three or more layers of nonmagnetic films, however, instead of disposing the intermediate layer among all the nonmagnetic films, the intermediate layer may be disposed between at least one pair of nonmagnetic films as occasion demands.

As the film constitution of the seed layer, the number of nonmagnetic films may further be increased such as nonmagnetic film-intermediate layer-nonmagnetic film described later in the following embodiment, further nonmagnetic film-intermediate layer-nonmagnetic film-intermediate layer-nonmagnetic film, and nonmagnetic film-intermediate layer-nonmagnetic film-nonmagnetic film-intermediate layer-nonmagnetic film. Moreover, in two or more nonmagnetic films, the material and film thickness constituting each nonmagnetic film may be the same or different. Similarly, in two or more intermediate layers, the material and film thickness constituting each intermediate layer may be the same or different.

Furthermore, the intermediate layer of the nonmagnetic film has roles of interrupting the crystal growth of the nonmagnetic film under the intermediate layer, depressing the generation of the excessively fine particles of the nonmagnetic film (under layer, magnetic layer) formed on the intermediate layer, reducing the average crystal particle diameter, and reducing (narrowing) the particle diameter distribution.

In the present invention, as described in the constitution 2, for the purpose of adjusting the crystal orientation of the magnetic layer, the under film may be formed between the seed layer and the magnetic layer.

Here, the under film is preferably formed of a material from which a high coercive force can be obtained. The under film can be constituted of one layer or two or more layers. As the under film, for example, a CrMo alloy, a CrV alloy, a CrW alloy, and the like can be used. When the Cr alloy is used in this manner, and the magnetic layer comprises the Co alloy, the matching of the lattice surface interval with the under film is enhanced, so that the easy axis of magnetization of the magnetic layer easily turns into the surface. As a result, the coercive force and electromagnetic properties are enhanced. Moreover, when the same coercive force is obtained, the film thickness of the Cr alloy can be reduced as compared with the under film of Cr, so that the excessive increase of the particle size by the increase of the film thickness of the Cr alloy can be depressed, and the S/N ratio is improved.

In the present invention, the intermediate film can also be formed between the under film and the magnetic layer as occasion demands, preferably in the position which abuts on the magnetic layer. This intermediate film is disposed for the purpose of enhancing the orientation of C-axis of the magnetic layer. The intermediate film is a nonmagnetic material, and the crystal system is preferably adapted to the crystal system of the magnetic layer. For example, in the CoPt-based magnetic layer, since the HCP crystal structure including the hexagonal closest packing crystal structure is constructed, the intermediate layer is provided with the HCP crystal structure, and CoCr, CoCrNb, CoCrPt, CoCrPtTa, and other alloys are preferable.

In the present invention, as described in the constitution 3, from the standpoint of the fine and uniform crystal particle diameter of the nonmagnetic film, and the coercive force, the thickness of each nonmagnetic film constituting the seed layer is in a range of 150 to 550 angstroms, and the total film thickness is preferably in a range of 300 to 1100 angstroms.

When the thickness of each nonmagnetic film is less than 100 angstroms, the decrease of the coercive force is undesirably large. When the film thickness exceeds 550 angstroms, the crystal particle diameter and particle diameter distribution of the nonmagnetic film increase, the crystal particle diameter of the under film and/or the magnetic layer accordingly increase, and the noise unfavorably becomes high. Additionally, the total thickness of the nonmagnetic films constituting the seed layer can appropriately be adjusted in accordance with the coercive force to be obtained.

In the present invention, as described in the constitution 4, from the standpoint of noise reduction, the film thickness of the intermediate layer is preferably in a range of 5 to 50 angstroms. Specifically, when the film thickness of the intermediate layer is less than 5 angstroms, the role of interrupting the crystal growth of the nonmagnetic film constituting the seed layer is not fulfilled, the upper-layer nonmagnetic film is formed with the crystal growth of the lower-layer nonmagnetic film reflected thereon as it is, the crystal particle diameter and particle diameter distribution increase, the noise increases, and the influence by the thermal fluctuation is easily exerted. Moreover, when the film thickness exceeds 50 angstroms, the crystal particle diameter of the intermediate layer increases, the crystal particle diameter and particle diameter distribution of the upper-layer nonmagnetic film increase, and the noise undesirably increases.

In the present invention, as described in the constitution 5, the intermediate layer preferably comprises the nonmagnetic material which includes the same crystal structure as that of the nonmagnetic film, in order to enhance the crystal growth of the magnetic layer.

In the present invention, as described in the constitution 6, the intermediate layer preferably comprises the material in which the crystal lattice surface interval does not match with that of the nonmagnetic film, in order to set the crystal particle diameter of the upper-layer nonmagnetic film to be fine. Specifically, a difference of the crystal lattice surface interval between the intermediate layer and the nonmagnetic film is preferably of the order of 0.01 to 0.011 nm.

In the present invention, as described in the constitution 7, the nonmagnetic film is not limited as long as the role of the seed layer (for obtaining the uniform and fine crystal particle diameter of the magnetic layer) is fulfilled, and preferably comprises one alloy selected from the group consisting of NiAl, AlCo, FeAl, FeTi, CoFe, CoTi, CoHf, CoZr, NiTi, CuZn, AlMn, AlRe, AgMg, CuSi, NiGa, CuBe, MnV, NiZn, FeV, CrTi, CrNi, NiAlRu, NiAlW, NiAlTa, NiAlHf, NiAlMo, NiAlCr, NiAlZr, NiAlNb, and $Al_2FeMn_2$.

In the present invention, as described in the constitution 8, the intermediate layer preferably comprises the Cr alloy formed of Cr and at least one type selected from the group consisting of Mo, V, W, and Ta. This is because in the above-described Cr alloy, the matching of the upper and lower seed layers is not deteriorated, only the particle diameter growth and distribution can be controlled, and there is preferably little dispersion of the magnetic properties. The content of at least one type selected from Mo, V, W, Ta in this Cr alloy is preferable in a range of 5 to 30 at %.

In the present invention, as disclosed in the constitution 9, the intermediate layer preferably comprises the alloy mainly containing Cr and W. This is because the dispersion of the magnetic properties is reduced and the productivity is stabilized by using the CrW alloy as the intermediate layer. When the CrW alloy is used, the content of W is preferably in a range of 5 to 30 at %. When the content is less than 5 at %, there is no effect of suppressing the particle growth of the seed layer or uniforming the particle diameter distribution. When it exceeds 30 at %, the matching with the upper seed layer is deteriorated, and the PW properties, S/N ratio, and coercive force are undesirably deteriorated. Additionally, other elements such as Nb may be contained by about 2 at % or less.

Additionally, in the above-described magnetic recording medium of the present invention, the substrate material is not particularly limited. For example, a glass substrate, a crystallized glass substrate, an aluminum alloy substrate, a ceramics substrate, a carbon substrate, a silicon substrate, and the like can be used.

In the magnetic recording medium of the present invention, the magnetic layer is not particularly limited.

Examples of the magnetic layer include the magnetic films mainly containing Co such as CoPt, CoCr, CoNi, CoNiCr, CoCrTa, CoPtCr, CoNiPt, CoNiCrPt, CoNiCrTa, CoCrPtTa, CoCrPtB, and CoCrPtTaNb. The magnetic layer may be provided with a multilayered constitution (e.g., CoCrPtTa/CrMo/CoCrPtTa, and the like) by separating the magnetic film with the nonmagnetic film (e.g., Cr, CrMo, CrV, CrMnC, and the like) to reduce the noises. The magnetic layer for a magnetoresistive head (MR head) or a giant magnetoresistive head (GMR head) may comprise the Co-based alloy, and an impurity element selected from Y, Si, rare earth elements, Hf, Ge, Sn, and Zn, or the oxide of the impurity element. Moreover, the magnetic layer may include a granular structure in which magnetic particles such as Fe, Co, FeCo, and CoNiPt are dispersed in the ferrite-based, or iron-rare earth element-based nonmagnetic film containing $SiO_2$ or BN. Moreover, the magnetic layer may use an in-plane or vertical recording format.

The protective layer, or the lubricant layer can be formed on the magnetic layer as occasion demands.

The protective layer is formed for the purpose of protecting the magnetic layer from the destruction by the contact sliding of the magnetic head. The protective layer can be constituted of one layer or two or more layers. Examples of the protective layer include a chromium film, a silicon oxide film, a carbon film, a hydrocarbon film, a carbon nitride film, a hydrocarbon nitride film, a zirconia film, a silicon nitride film, a silicon carbide film, and the like. Additionally, the protective layer can be formed by the known film forming methods such as sputtering.

The lubricant layer is disposed for the purpose of reducing the resistance by the contact sliding with the magnetic head, and liquid lubricants such as perfluoropolyether are usually used.

A thermal stability measuring method and a thermal stability measuring apparatus of the present invention have the following constitutions.

(Constitution 10) By disposing a magnetic recording medium constituted by forming at least a magnetic layer on a substrate, and a magnetic head comprising a read/write element provided with a read element and a write element fixed to one end of a head support member on the main surface of the magnetic recording medium under an atmosphere heated to a predetermined temperature, relatively moving the magnetic head with respect to the main surface, writing a signal to a predetermined track position on the magnetic layer by the write element, detecting the write signal written to the track by the read element, and comparing the write signal with the detected signal to calculate the signal attenuation of the magnetic recording medium, the thermal stability of the magnetic recording medium is measured. The write track width of the write element is set to be larger than the total of the track width of a radial direction of the track position on the magnetic layer, and the movement amount of the track position in the radial direction by thermal expansion caused by heating the head support member.

(Constitution 11) After a step of preparing a magnetic recording medium constituted by forming at least a magnetic layer on a substrate, the magnetic recording medium is rotated to dispose a magnetic head on the main surface of the magnetic recording medium, the magnetic head comprising a read/write element which is opposite to the main surface of the magnetic recording medium and whose write track width is twice or more as large as a read track width. The method also comprises the steps of: relatively moving the magnetic head on the main surface with respect to the main surface; disposing the magnetic recording medium and the magnetic head under an atmosphere heated to a predetermined temperature; writing a signal to the magnetic layer of the magnetic recording medium by the read/write element of the magnetic head; detecting the write signal written to the magnetic layer by the read/write element of the magnetic head; and comparing the write signal with the detected signal to calculate the signal attenuation of the magnetic recording medium.

(Constitution 12) After a step of preparing a magnetic recording medium constituted by forming at least a magnetic layer on a substrate, the magnetic recording medium is rotated to dispose/fix a magnetic head on the main surface of the magnetic recording medium, the magnetic head comprising a read/write element which is opposite to the main surface of the magnetic recording medium and whose write track width is twice or more as large as a read track width. The method also comprises the steps of: relatively moving the magnetic head on the main surface with respect to the main surface; disposing the magnetic recording medium and the magnetic head under an atmosphere heated to a predetermined temperature; writing a signal to the magnetic layer of the magnetic recording medium by the read/write element of the magnetic head; detecting the write signal written to the magnetic layer by the read/write element of the magnetic head; and comparing the write signal with the detected signal to calculate the signal attenuation of the magnetic recording medium.

(Constitution 13) There are provided: a head/disc mechanism section provided with a mechanism for rotating a magnetic disk, and a magnetic head comprising a read/write element whose write track width is twice or more as large as a read track width; a read/write circuit section having a function of performing writing and reading of a signal with respect to the magnetic disk; a signal evaluating section having a function of measuring and evaluating a read signal of the magnetic disk read from the read/write element; and an environmental tank containing at least the head/disk mechanism section and being controllable in temperature.

(Constitution 14) In the thermal stability measuring apparatus of the magnetic recording medium according to the constitution 13, the head/disk mechanism section comprises a mechanism for fixing the magnetic head to a predetermined position above the main surface of the magnetic disk.

(Constitution 15) There are provided: a head/disc mechanism section provided with a mechanism for rotating a magnetic disk, and a head comprising a read/write element including a read element and a write element disposed opposite to the main surface of the magnetic disk and on one end of a head support member; a read/write circuit section having a function of performing writing and reading of a signal with respect to the magnetic disk; a signal evaluating section having a function of measuring and evaluating a read signal of the magnetic disk read from the read/write element; and an environmental tank containing at least the head/disk mechanism section and being controllable in temperature. The write track width of the write element is larger than the total of the track width of a radial direction of the track position of the magnetic layer, and the movement amount of the track position in the radial direction by thermal expansion caused by heating the head support member.

In the present invention, by setting the write track width of the write element of the head to be larger than the total of the track width of the radial direction of the track position on the magnetic layer of the magnetic disk, and the movement amount of the track position in the radial direction by thermal expansion of the support member for supporting the head by the thermal influence, only the signal attenuation by the thermal fluctuation of the magnetic recording medium can accurately be measured and evaluated without being influenced by a thermal off-track.

Moreover, in the present invention, there is provided a technique of using the head comprising the read/write element in which the write track width is twice or more as large as the read track width. Therefore, only the signal attenuation by the thermal fluctuation of the magnetic recording medium can accurately be measured and evaluated without being influenced by the thermal off-track.

Furthermore, in addition to the predetermined head, by employing a mechanism in which a head arm as the head support member is mechanically fixed, the magnetic head is fixed/disposed onto the predetermined position on the main surface of the magnetic recording medium, and the magnetic head is relatively moved to the main surface on the main surface, with respect to head positioning, complicated mechanisms such as micro-positioning (mechanism for matching the read track with the write track) are unnecessary, and the head driving apparatus and medium driving apparatus can be miniaturized, so that the projection to the environmental tank is facilitated. Therefore, the measurement and evaluation are easily possible at low costs while the external environments such as a temperature are changed.

Additionally, when the head write track width is less than twice as large as the read track width, the influence of the thermal off-track is possibly exerted. The upper limit is not especially limited, but the write track width is preferably of the order of twice to five times as large as the read track width (however, the write track width is preferably 2 µm or more to minimize the influence of the thermal off-track), because the influences of the thermal off-track and other off-tracks can securely and completely be avoided. The width is also preferable with respect to the balance of the head.

BRIEF DESCRIPTION OF THE DRAWINGS

FIG. 2 is a table showing the properties of the magnetic recording media of examples and comparative examples.

FIG. 3 is a table showing the properties of the magnetic recording media of examples and comparative examples.

DETAILED DESCRIPTION OF THE PREFERRED EMBODIMENTS

A magnetic recording medium and a thermal stability measuring apparatus of the present invention will further concretely be described with reference to examples.

First, the magnetic recording medium in which a nonmagnetic layer is disposed between at least one pair of magnetic layers will be described.

EXAMPLE 1

Figure 1A:
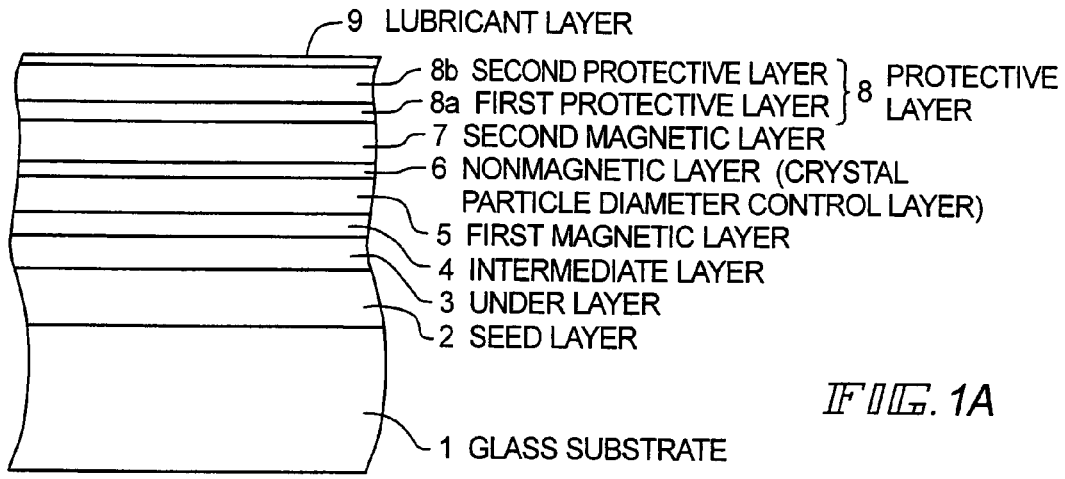
FIG. 1 is a partial sectional view of a magnetic recording medium according to a first example of the present invention.
Figure 1B:
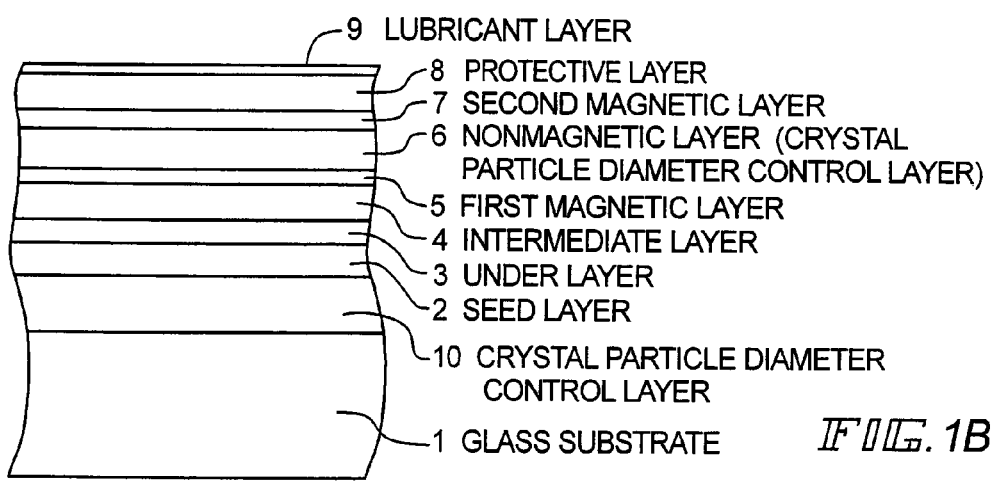
Figure 1C:
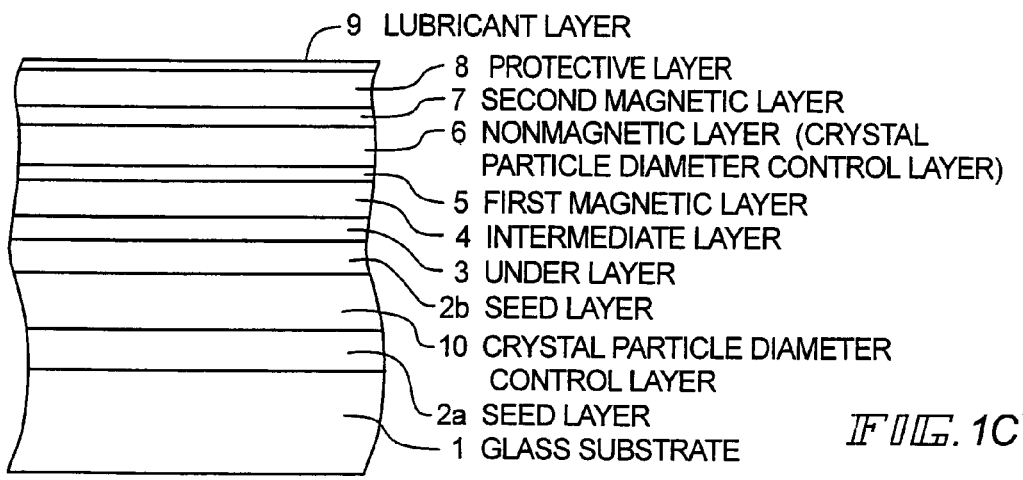
Figure 4:
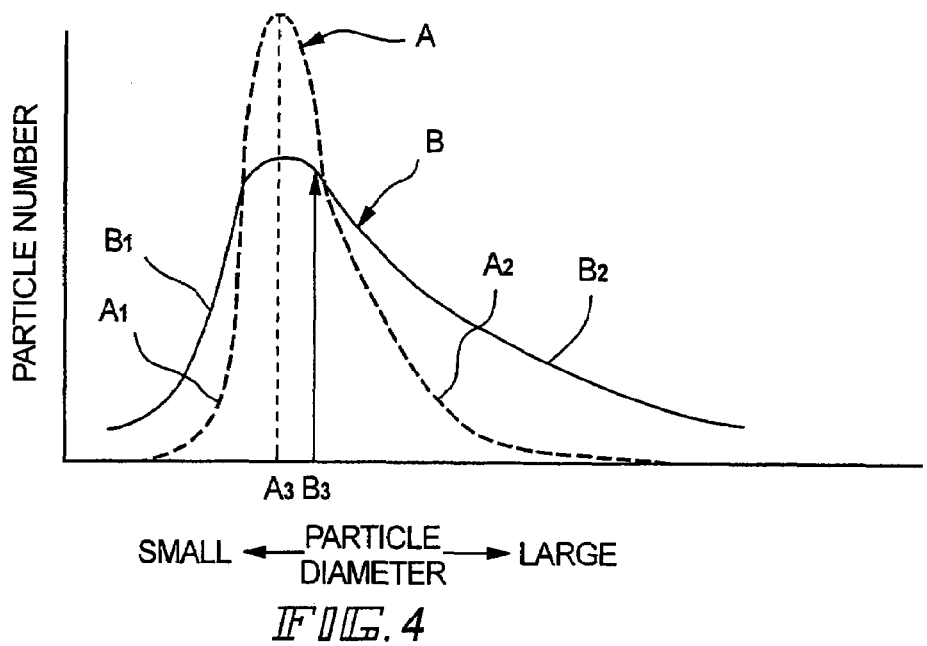
FIG. 4 is an explanatory view showing the action of a seed layer of the present invention.

As shown in FIG. 1, the magnetic recording medium of Example 1 comprises a magnetic disk formed by successively laminating a seed layer 2, an under layer 3, an intermediate layer 4, a first magnetic layer 5, a nonmagnetic layer 6, a second magnetic layer 7, a protective layer 8, and a lubricant layer 9 on a glass substrate 1.

The glass substrate 1 is formed of a chemically reinforced aluminosilicate glass, and the surface is mirror-polished to provide a surface roughness Rmax=3.2 nm, Ra=0.3 nm. The seed layer 2 comprises an NiAl thin film (film thickness: 700 angstroms). Additionally, this NiAl thin film is constituted at a composition ratio of Ni: 50 at %, Al: 50 at %.

The under layer 3 is a CrMo thin film (film thickness: 100 angstroms), and is disposed to enhance the crystal structure of the magnetic layer. Additionally, this CrMo thin film is constituted at a composition ratio of Cr: 90 at %, Mo: 10 at %. Moreover, the intermediate layer 4 is a CoCr thin film (film thickness: 50 angstroms), and is disposed to enhance the orientation of C-axis of the magnetic layer. Additionally, this CoCr thin film is a nonmagnetic film with an HCP crystal structure at a ratio of Co: 65 at %, Cr: 35 at %.

Each of the first and second magnetic layers 5, 7 comprises the same film material of a CoPtCrTa alloy, and has a film thickness of 120 angstroms. Each content of Co, Pt, Cr, Ta of the magnetic layer is as follows. Specifically, the first magnetic layer contains Co: 72.5 at %, Pt: 8 at %, Cr: 16 at %, Ta: 3.5 at %. The second magnetic layer contains Co: 71 at %, Pt: 8 at %, Cr: 18 at %, Ta: 3 at %.

The intermediate layer 4 present between the first magnetic layer 5 and the second magnetic layer 7 is a CrMnC thin film (film thickness: 30 angstroms) and the composition ratio is Cr: 97.95 at %, Mn: 2.00 at %, C: 0.05 at %.

The protective layer 8 prevents the magnetic layer from being deteriorated by contact with the magnetic head, and is constituted of two layers, first protective layer 8a and second protective layer 8b laminated in order from the side of the magnetic layer. The first protective layer 8a comprises a Cr film with a film thickness of 50 angstroms, and forms a chemical protective layer to prevent the magnetic properties of the magnetic layer from being deteriorated by oxidation. The other, second protective layer 8b comprises a hydrocarbon film with a film thickness of 100 angstroms and can provide resistance to wear.

The lubricant layer 9 comprises a liquid lubricant of perfluoropolyether, and this film moderates the contact with the magnetic head. Additionally, the film thickness is 8 angstroms.

A method of manufacturing a magnetic disk constituted as described above will be described hereinafter. First, a mirror surface (Rmax=3.2 nm, Ra=0.3 nm) was formed by precisely polishing the main surface of the glass substrate 1 chemically reinforced by ion exchange. Subsequently, the seed layer 2, under layer 3, intermediate layer 4, first magnetic layer 5, nonmagnetic layer 6, second magnetic layer 7, first protective layer Sa, and second protective layer 8b were successively formed into films on the main surface of the glass substrate 1 by in-line sputtering. The seed layer 2, under layer 3, intermediate layer 4, first magnetic layer 5, nonmagnetic layer 6, second magnetic layer 7 and first protective layer Sa were formed in an atmosphere of Ar gas whereas the second protective layer 8b were formed in an atmosphere of Ar+$H_2$($H_2$: 7%) mixture gases.

Subsequently, the second protective layer 8b was dip-treated with the liquid lubricant of perfluoropolyether to form the lubricant layer 9 thereon, thereby obtaining the magnetic disk. For the measurement results of coercive force, S/N ratio, PW50 of the obtained magnetic disk, the coercive force was satisfactory at 2300 Oe, the S/N ratio was 29.5 dB, and PW50 was also satisfactory at 22.8 nsec. Moreover, the signal attenuation was −0.080 dB/decade, Ku·V/kT=90 at 100 kfci, 60° C.

Additionally, the coercive force, S/N ratio, PW50 were measured by the following measuring methods. The measurement of the coercive force comprised: cutting a 8 mmφ sample from the manufactured magnetic disk; applying a magnetic field toward the film surface; and performing measurement at a maximum external applied magnetic field of 10 kOe by a vibrating sample magnetometer VSM. Furthermore, the recording readback output was measured by: using an MR head with a magnetic head flying height of 0.025 µm; setting the relative rate of the MR head and the magnetic disk to 10 m/sec; and measuring the recording readback output in a linear recording density of 346 kfcl (the linear recording density of 346000 bits per inch). Moreover, the noise spectrum during signal recording regeneration was measured by a spectrum analyzer by setting a carrier frequency to 67.6 MHz, and a measurement band to 76.3 MHz. The MR head used in the measurement had a track width of 1.2/0.9 µm, and a magnetic head gap length of 0.27/0.15 µm on a write/read side.

Moreover, the PW50 (the mesial magnitude width of the isolated regeneration signal) was measured by: extracting an isolated readback signal with an read/write tester (GUZIK) provided with the MR head for the PW50 measurement; and measuring the width of an isolated waveform in 50% of the peak value of an output signal to the ground (0) as PW50. Additionally, for a high recording density, a smaller PW50 is preferable. This is because more pulses (signals) can be written on the same area with a narrow pulse width. On the other hand, when the PW50 is large, adjacent pulses (signals) interfere with each other, and an error appears during reading of the signal. This waveform interference deteriorates an error rate. This necessitates the setting of PW50 to 23.5 nsec or less.

Furthermore, the thermal fluctuation properties were measured as follows.

First, an activated magnetic moment (vIsb) as a product of an activation volume (v) and a saturation moment (Isb) of a magnetization reversal minimum unit was calculated by the fluctuation field (Hf) obtained by Waiting Time process.

In the Waiting Time process, measurement is performed as follows.

In a remanence magnetization curve measurement, Hr(t) is measured by successively changing the waiting time of a magnetic field. The measurement comprises: placing the cut φ8 mm sample onto a sample signal type magnetometer (VSM) and applying a sufficiently large positive magnetic field to the sample; applying a micro negative magnetic field H1 to remove the magnetic field; measuring a remanence magnetization M1; and again applying the positive magnetic field, applying a magnetic field H2 larger than H1 to remove the magnetic field, and subsequently measuring a residual magnetization M2. The similar operation is repeated until M1 reaches a residual magnetization Mr. Obtained (Hi, Mi) is plotted to obtain the residual magnetization curve. The value of magnetic field H in M=0 is defined as Hr (remanence coercive force).

Subsequently, the sufficiently large positive magnetic field is applied to the sample, the negative magnetic field H1 is applied for a waiting time of 15 seconds, the magnetic field is then removed, and the residual magnetization M1(15) is measured. Furthermore, the positive magnetic field is applied to the sample, the negative magnetic field H2 is applied for 15 seconds, the magnetic field is then removed, and the residual magnetization M2(15) is measured. The measuring operation is repeated until Mi(15) equals the residual magnetization Mr. The obtained (Hi, Mi(15)) is plotted to obtain the residual magnetization curve for the waiting time of 15 seconds. The H value in M=0 is defined as Hr(15).

The similar operation is repeated for a waiting time of 15 seconds, 30 seconds, 60 seconds, 120 seconds, 240 seconds, 480 seconds (8 minutes), and the magnetic field Hr(15), Hr(30), Hr(60), Hr(120), Hr(240), Hr(480) in each waiting time is obtained. When this Hr(t) is plotted with respect to a time logarithm (ln t), Hr(t) linearly decreases, and the thermal fluctuation field Hf is obtained by the inclination dHr(t)/d(ln t). From Hf obtained in this manner, vIsb is calculated by the following equation.

$$vIsb = kT/Hf$$

Here, k denotes Boltzmann's constant ($1.38 \times 10^{-16}$ erg/k), and T denotes an absolute temperature (K) being measured.

The activation volume v is used as the volume of the minimum unit of the magnetization reversal of the magnetic layer, and vIsb obtained by multiplying the volume by the saturation magnetization (Isb) is the magnetic moment amount of the minimum unit of the magnetization reversal.

Moreover, in calculation of vKu/kT, v and Ku need to be measured, but there is a relation of Ku=(Hk·Isb)/2, and the following equation is calculated by further assuming $Hc_0 = Hk/2$.

$$v \cdot ku = v \cdot Hk \cdot Isb/2 = vIsb \cdot Hk/2 = vIsb \cdot Hc_0$$

Here, $Hc_0$ denotes coercive force Hc before the coercive force Hc is deteriorated by the thermal fluctuation, and is coercive force Hc which can be obtained in a measurement time of $10^{-9}$ sec. Moreover, Hk denotes an anisotropic magnetic field owned by the minimum unit of the magnetization reversal, and vIsb denotes an activation magnetic moment.

Since $Hc_0$ as the coercive force Hc before the deterioration of coercive force Hc by the thermal fluctuation cannot substantially be measured, Sherlock's equation is used to calculate $Hc_0$ from Hc and vIsb. The Sherlock's Law is an approximate equation dependent on the measurement time of Hc obtained as a result of micro magnetic simulation, and is represented as follows.

$$Hc/Hc_0 = 1 - \{(kT/vKu)\ln(f_0 \cdot t)\hat{\ }0.735\}$$

Moreover, when the above-described assumption of $Hc_0 = Hk/2$ is taken, the equation is modified as follows.

$$Hc/Hc_0 = 1 - \{(kT/vIsb \cdot Hc_0)\ln(f_0 \cdot t)\hat{\ }0.735\}$$

Here, k denotes Boltzmann's constant ($1.38 \times 10^{-16}$ erg/k), T denotes the measurement absolute temperature, $f_0$ denotes a vibration (fluctuation) factor ($10\hat{\ }9$ HZ), t denotes a measurement time (600 sec), and vIsb denotes an activation magnetic moment (emu). Since the values other than $Hc_0$ are known in the above equation, $Hc_0$ can be obtained by performing numeric analysis/calculation of $Hc_0$. In the following examples and comparative examples, the coercive force, S/N ratio, PW50, signal attenuation, and Ku·V/kT are measured based on the above-described measuring method.

COMPARATIVE EXAMPLE 1

The magnetic disc was formed in the similar manner as in Example 1, except that the nonmagnetic layer 6 of CrMnC of Example 1 was formed as a CrMo thin film (Cr: 94 at %, Mo: 6 at %) (Comparative Example 1). When the coercive force, S/N ratio, and PW50 of the magnetic disk were measured, the coercive force was 2300 Oe, the S/N ratio was 29.5 dB, the PW50 was 23.8 nsec, and PW50 did not obtain a satisfactory result. Moreover, the error rate indicated a high value as compared with Example 1. Moreover, the signal attenuation was −0.095 dB/decade, Ku·V/kT=80 at 100 kfci, 60° C. Here, with respect to the thermal fluctuation properties, the higher coercive force is preferable. When the value of the S/N ratio increases, the noises are preferably reduced. Moreover, the smaller PW50 (half value width of isolated regeneration signal) value is preferable, and it is said that a difference of about 1.0 nsec produces a difference of about 1.3 Gb/inch$^2$. When the signal attenuation decreases, the thermal fluctuation resistance is preferably enhanced. Specifically, Ku·V/kT≧85 is preferable.

EXAMPLES 2 TO 5, COMPARATIVE EXAMPLES 2 AND 3

The magnetic discs were formed in the similar manner as in Example 1, except that the film thickness of the nonmagnetic layer 6 of CrMnC of Example 1 was set to 5 angstroms (Example 2), 10 angstroms (Example 3), 50 angstroms (Example 4), 100 angstroms (Example 5), 3 angstroms (Comparative Example 2), and 120 angstroms (Comparative Example 3). The coercive force, S/N ratio, PW50, signal attenuation (dB/decade), Ku·V/kT of these magnetic disks are as shown in a table of FIG. 2.

As apparent from the table of FIG. 2, the film thickness of the nonmagnetic layer of CrMnC is preferably in a range of 5 to 100 angstroms in view of the coercive force, S/N ratio, PW50 magnetic properties, signal attenuation, and Ku·V/kT thermal fluctuation.

EXAMPLES 6 TO 10, COMPARATIVE EXAMPLES 4 TO 7

The magnetic discs were formed in the similar manner as in Example 1, except that the composition of the nonmagnetic layer 6 of $CrMn_2C_{0.05}$ (Cr: 97.95 at %, Mn: 2 at %, C: 0.05 at %) of Example 1 was changed to $CrMn_{0.5}C_{0.01}$ (Cr: 99.49 at %, Mn: 0.5 at %, C: 0.01 at %) (Example 6), $CrMn_5C_{0.01}$ (Cr: 94.99 at %, Mn: 5 at %, C: 0.01 at %) (Example 7), $CrMn_2C_{0.1}$ (Cr: 97.9 at %, Mn: 2 at %, C: 0.1 at %) (Example 8), $CrMn_2C_{0.5}$ (Cr: 97.5 at %, Mn: 2 at %, C: 0.5 at %) (Example 9), $CrC_{0.2}$ (Cr: 99.8 at %, C: 0.2 at %) (Example 10), $CrMn_2$ (Cr: 98 at %, Mn: 2 at %) (Comparative Example 4), $CrMn_2C_{0.55}$ (Cr: 97.45 at %, Mn: 2 at %, C: 0.55 at %) (Comparative Example 5), $CrMn_{0.4}C_{0.01}$ (Cr: 99.59 at %, Mn: 0.4 at %, C: 0.01 at %) (Comparative Example 6), and $CrMn_6C_{0.01}$ (Cr: 93.99 at %, Mn: 6 at %, C: 0.01 at %) (Comparative Example 7). The coercive force, S/N ratio, and PW50 of these magnetic disks are as shown in a table of FIG. 3.

EXAMPLES 11 TO 13

The magnetic recording media were formed in the similar manner as in Example 1, except that the nonmagnetic layer (crystal particle diameter control layer) of CrMnCN(layer thickness: 500 Å) of Example 1 was formed between the substrate and the seed layer (Example 11, FIG. 1b), the seed layer was constituted of two layers and the nonmagnetic layer (crystal particle diameter control layer) of CrMnC (layer thickness: 15 Å) of Example 1 was formed between the seed layers (Example 12, FIG. 1c), and 15 at % of Mo was added to the material (Mn: 2 at %, C: 0.05 at %, Mo: 15 at %, Cr: residue) of the nonmagnetic layer (crystal particle diameter control layer) of Example 1 (Example 13). The nonmagnetic layer constituted of CrMnCN was formed in an atmosphere of $Ar+N_2(N_2: 20$ at %) mixture gases by in-line sputtering.

In the magnetic recording medium of Example 11, by further disposing the CrMnC layer under the seed layer, the crystal orientation properties of the magnetic layer (Co) is enhanced, and as compared with Example 1, the S/N ratio and PW50 value are equivalent, and the coercive force is enhanced by +70 Oe. In the magnetic recording medium of Example 12, by constituting the seed layer by two layers, the grain growth of the seed layer (NiAl) is inhibited, the upper layer film from the second seed layer is finely divided by the nonmagnetic layer of CrMnC, and the Pw50 value is therefore reduced by 0.5 nsec and improved as compared with Example 1. Moreover, in the magnetic recording medium of Example 13, since the matching with the magnetic layer is enhanced, as compared with Example 1, the PW50 value is equivalent, the coercive force is enhanced by +50 Oe, and the S/N ratio is enhanced by +0.3 dB. As described above, as compared with Example 1, further satisfactory result is obtained in the magnetic properties, and the thermal fluctuation resistance is sufficiently satisfied.

As apparent from the table of FIG. 3, the nonmagnetic layer is an alloy containing at least Cr and C, preferably an alloy containing Cr, C and Mn, the content of C is preferably in a range of 0.01 to 0.5 at %, and the content of Mn is preferably in a range of 0.5 to 5 at %.

Additionally, a CrX (X: Mo, W, Ta, V, Ti) alloy may be used instead of Cr. In this case, the content of X is in a range of 5 to 30 at %. Moreover, in the above-described examples, the nonmagnetic layer of the alloy containing Cr and C is interposed between the magnetic layers, but the nonmagnetic layer of the present invention may be disposed under the substrate-side magnetic layer.

Another magnetic recording medium will next be described, in which between the nonmagnetic films constituting the seed layer, the intermediate layer formed of the material different from that of the nonmagnetic layer is interposed.

EXAMPLE 11

Figure 5:
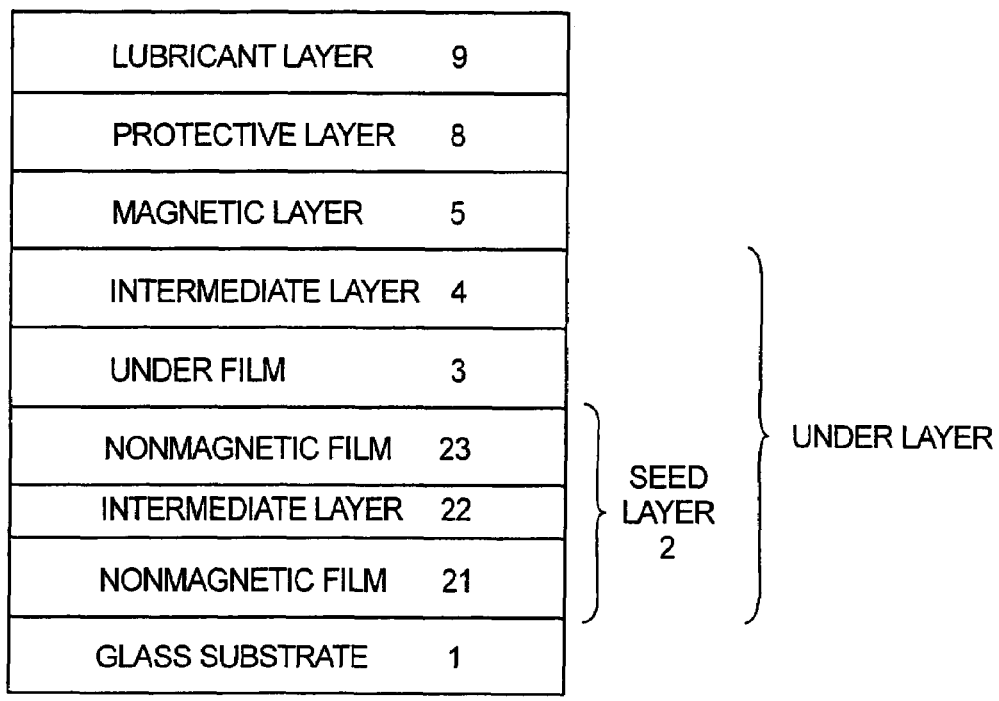
FIG. 5 is a schematic diagram showing a magnetic disk according to one embodiment of the present invention.

As shown in FIG. 5, the magnetic recording medium of the present example comprises a magnetic disk formed by successively laminating the seed layer 2, under layer 3, intermediate layer 4, magnetic layer 5, protective layer 8, and lubricant layer 9 on the glass substrate 1.

The glass substrate 1 comprises the chemically reinforced aluminosilicate glass, and the surface is mirror-polished to provide a surface roughness Rmax=3.2 nm, Ra=0.3 nm.

The seed layer 2 comprises two layers of alloy film 21 and alloy film 23, and an intermediate layer 22, disposed between the alloy films, for interrupting the crystal growth of the alloy film 21, the alloy film 21 is an NiAl thin film (film thickness of 300 angstroms), the intermediate layer 22 is a CrW thin film (film thickness of 30 angstroms), and the alloy film 23 is an NiAl thin film (film thickness of 300 angstroms). Additionally, the NiAl thin film constituting the alloy film 21 or 23 is constituted at a composition ratio of Ni: 50 at %, Al: 50 at %, and the CrW thin film constituting the intermediate layer 22 is constituted at a composition ratio of Cr: 90 at %, W: 10 at %.

The under layer is a CrMo thin film (film thickness: 100 angstroms), and is disposed to enhance the crystal structure of the magnetic layer. This CrMo thin film is constituted at a composition ratio of Cr: 90 at %, Mo: 10 at %.

Moreover, the intermediate layer 4 is a CoCr thin film (film thickness: 30 angstroms), and is disposed to enhance the orientation of C-axis of the magnetic layer. Additionally, this CoCr thin film is a nonmagnetic film with an HCP crystal structure at a ratio of Co: 65 at %, Cr: 35 at %.

The magnetic layer 5 is a CoCrPtTa alloy thin film (film thickness: 240 angstroms), and the contents of Co, Cr, Pt, Ta are Co: 72.5 at %, Cr: 16 at %, Pt: 8 at %, Ta: 3.5 at %.

The protective layer 8 prevents the magnetic layer from being deteriorated by contact with the magnetic head, and comprises a hydrocarbon film with a film thickness of 100 angstroms.

The lubricant layer 9 comprises a liquid lubricant of perfluoropolyether, and this film moderates the contact with the magnetic head. Additionally, the film thickness is 8 angstroms.

A method of manufacturing the magnetic disk constituted as described above will next be described.

First, the mirror surface (Rmax=3.2 nm, Ra=0.3 nm) was formed by precisely polishing the main surface of the glass substrate 1 chemically reinforced by ion exchange. Subsequently, the seed layer 2, under layer 3, intermediate layer 4, magnetic layer 5, and protective layer 8 were successively formed as the films on the main surface of the glass substrate 1 by the in-line sputtering. Subsequently, the protective layer 8 was dip-treated with the liquid lubricant of perfluoropolyether to form the lubricant layer 9 thereon, thereby obtaining the magnetic disk.

For the measurement results of coercive force, S/N ratio, PW50 of the obtained magnetic disk, the coercive force was 2800 Oe and satisfactory, the S/N ratio was 29.43 dB, and PW50 was 18.78 nsec and also satisfactory. Moreover, the output signal attenuation was −0.05 dB/decade at 100 kfci, 60° C., and Ku·V/kT indicating the thermal fluctuation properties was satisfactorily 110. Here, with respect to the thermal fluctuation resistance, the higher coercive force is preferable. When the value of the S/N ratio increases, the noises are preferably reduced, and it is said that, for example, a difference of about 0.05 dB produces a difference in recording density of about 0.6 Gb/inch$^2$. The smaller PW50 value is preferable, and it is said that a difference of about 0.6 nsec produces a difference in recording density of about 0.8 Gb/inch$^2$. The smaller output signal attenuation is preferable. When the value of Ku·V/kT increases, the thermal fluctuation resistance is preferably enhanced. Specifically, the value of Ku·V/kT is preferably 90 or more.

Additionally, the coercive force, S/N ratio, PW50, properties of output decay, and thermal fluctuation properties (Ku·V/kT) were measured by the following measuring methods.

The measurement of the coercive force comprised: cutting the 8 mmφ sample from the manufactured magnetic disk; applying the magnetic field toward the film surface; and performing measurement at the maximum external applied magnetic field of 10 kOe by the sample vibrating magnetometer.

The S/N ratio was obtained by measuring the recording readback output as follows. The measurement comprised: using the magnetoresistive head (MR head) with a magnetic head flying height of 0.025 μm; setting the relative rate of the MR head and the magnetic disk to 10 m/sec; and measuring the recording readback output in a linear recording density of 346 kfcl (the linear recording density of 346000 bits per inch). Moreover, the noise spectrum during signal recording regeneration was measured by the spectrum analyzer by setting the carrier frequency to 67.6 MHz, and the measurement band to 76.3 MHz. The MR head used in the measurement had a track width of 1.2/0.9 μm, and a magnetic head gap length of 0.27/0.15 μm on the write/read side.

The PW50 was measured by: extracting the isolated readback signal with the read/write tester (GUZIK) provided with the MR head for the PW50 measurement; and measuring the width of the isolated waveform in 50% of the peak value of the output signal to the ground (0) as PW50. Additionally, for the high recording density, the smaller PW50 is preferable. This is because more pulses (signals) can be written on the same area with the narrow pulse width. On the other hand, when the PW50 is large, the adjacent pulses (signals) interfere with each other, and the error appears during reading of the signal. This waveform interference deteriorates the error rate. This necessitates the setting of PW50 to 19.2 nsec or less.

The measurement of the properties of output decay was performed as follows.

In order to accurately evaluate only the signal attenuation by the thermal fluctuation of the magnetic recording medium without being influenced by a thermal off-track (a phenomenon in which the magnetic head deviates from the track on the magnetic recording medium by the thermal expansion of a head suspension, thereby causing signal attenuation), the MR head comprising the read/write element whose write track width is twice or more times as large as the read track width is prepared, and placed in the head/disc mechanism section in the system together with the magnetic disk as the obtained magnetic recording medium. Subsequently, the head/disk mechanism section is projected to an environmental tank in which a temperature can be controlled, and exposed to a high-temperature environment. When the inside of the environmental tank is stabilized at a preset temperature, by feeding a write signal to an MR head write element from a read/write circuit section, the signal is written to the magnetic disk. Subsequently, immediately after the signal is written, the signal written to the magnetic disk is read via an MR head read element, amplified in the read/write circuit section, and then measured in a signal evaluating section. The signal evaluating section records the amplitude value of the read signal at a constant time interval. The signal evaluating section performs measurement, for example, by using the spectrum analyzer.

For the measurement conditions, the temperature of the environmental tank is 60° C., and the recording density of the signal written to the magnetic disk is 100 KFlux/inch. Moreover, the head used in the measurement is an MR head which has a write track width of 12.0 µm, a read track width of 2.4 µm, a write gap length of 0.35 µm, a read gap length of 0.30 µm, and a read/write element part float-up amount of 20 nm.

Moreover, the thermal fluctuation properties were measured as follows.

The activated magnetic moment (vIsb) as the product of the activation volume (v) and the saturation magnetization (Isb) of the magnetization reversal minimum unit was calculated by the fluctuation field (Hf) obtained by Waiting Time process. In the Waiting Time process, measurement is performed as follows. In the residual magnetization curve measurement, Hr(t) is measured by successively changing the waiting time of the magnetic field. The measurement comprises: placing the cut φ8 mm sample onto the sample signal type magnetometer (VSM) and applying a sufficiently large positive magnetic field to the sample; applying a micro negative magnetic field H1 to remove the magnetic field; measuring the residual magnetization M1; and again applying the positive magnetic field, applying the magnetic field H2 larger than H1 to remove the magnetic field, and subsequently measuring the residual magnetization M2. The similar operation is repeated until Mi reaches the residual magnetization Mr. The obtained (Hi, Mi) is plotted to obtain the residual magnetization curve. The value of magnetic field H in M=0 is defined as Hr (remanence coercive force).

Subsequently, the sufficiently large positive magnetic field is applied to the sample, the negative magnetic field H1 is applied for a waiting time of 15 seconds, the magnetic field is then removed, and the residual magnetization M1(15) is measured. Furthermore, the positive magnetic field is applied to the sample, the negative magnetic field H2 is applied for 15 seconds, the magnetic field is then removed, and the residual magnetization M2(15) is measured. The measuring operation is repeated until Mi(15) equals the residual magnetization Mr. The obtained (Hi, Mi) (15) is plotted to obtain the residual magnetization curve for the waiting time of 15 seconds. The H value in M=0 is defined as Hr(15).

The similar operation is repeated for a waiting time of 15 seconds, 30 seconds, 60 seconds, 120 seconds, 240 seconds, 480 seconds (8 minutes), and the magnetic field Hr(15), Hr(30), Hr(60), Hr(120), Hr(240), Hr(480) in each waiting time is obtained. When this Hr(t) is plotted with respect to a time logarithm (ln t), Hr(t) linearly decreases, and the thermal fluctuation field Hf is obtained by the inclination $dHr(t)/d(\ln t)$. From Hf obtained in this manner, vIsb is calculated by the following equation.

$$vIsb = kT/Hf$$

Here, k denotes Boltzmann's constant ($1.38 \times 10^{-16}$ erg/k), and T denotes an absolute temperature (K) being measured.

The activation volume v is used as the volume of the minimum unit of the magnetization reversal of the magnetic layer, and vIsb obtained by multiplying the volume by the saturation magnetization (Isb) is the magnetic moment amount of the minimum unit of the magnetization reversal.

Moreover, in the calculation of $v \cdot Ku/kT$, v and Ku need to be measured, but there is a relation of $Ku = (Hk \cdot Isb)/2$, and the following equation is calculated by further assuming $Hc_0 = Hk/2$.

$$v \cdot ku = V \cdot Hk \cdot Isb/2 = vIsb \cdot Hk/2 = vIsb \cdot Hc0$$

Here, Hc0 denotes coercive force Hc before the coercive force Hc is deteriorated by the thermal fluctuation, and is coercive force Hc which can be obtained in a measurement time of $10^{-9}$ sec. Moreover, Hk denotes an anisotropic magnetic field owned by the minimum unit of the magnetization reversal, and vIsb denotes an activation magnetic moment.

Since Hc0 as the coercive force Hc before the deterioration of coercive force Hc by the thermal fluctuation cannot substantially be measured, Sherlock's equation is used to calculate Hc0 from Hc and vIsb. The Sherlock's Law is an approximate equation dependent on the measurement time of Hc obtained as a result of micro magnetic simulation, and is represented as follows.

$$Hc/Hc0 = 1 - \{(kT/v \cdot Ku)\ln(f0 \cdot t)^{\wedge} 0.735\}$$

Moreover, when the above-described assumption of Hc0=Hk/2 is taken, the equation is modified as follows.

$$Hc/Hc0 = 1 - \{(kT/vIsb \cdot Hc0)\ln(f0 \cdot t)^{\wedge} 0.735\}$$

Here, k denotes Boltzmann's constant ($1.38 \times 10^{-16}$ erg/k), T denotes the measurement absolute temperature, f0 denotes a vibration (fluctuation) factor ($10^{\wedge}9$ Hz), t denotes a measurement time (600 sec), and vIsb denotes an activation magnetic moment (emu).

Since the values other than Hc0 are known in the above equation, Hc0 can be obtained by performing numeric analysis/calculation of Hc0.

Additionally, in the following examples and comparative examples, the coercive force, S/N ratio, PW50, output signal attenuation, and thermal fluctuation properties were measured based on the above-described measuring methods.

COMPARATIVE EXAMPLE 11

The magnetic disk was formed in a similar manner as Example 11 except that the seed layer 2 of Example 11 was formed as a single layer of NiAl thin film with a film thickness of 600 angstroms (Ni: 50 at %, Al: 50at %).

When the coercive force, S/N ratio, PW50, properties of output decay, Ku·V/kT of the magnetic disk were measured, the coercive force was 2800 Oe, the S/N ratio was 29.63 dB, PW50 was 19.4 nsec, and a satisfactory result was not obtained for the PW50 value. Here, usually to raise the coercive force, a certain degree of thick under layer is necessary. However, when the film thickness of the under layer increases, the crystal particle diameter of the magnetic layer increases, and PW50 and S/N ratio are deteriorated. When the seed layer 2 of Example 11 is used, a desired coercive force can be obtained while maintaining the PW50 and S/N ratio.

Moreover, the magnetic disk of Comparative Example 11 indicated a high value of error rate as compared with Example 11. Furthermore, the output signal attenuation was −0.07 dB/decade under the measurement conditions of 100 Kfci and 60° C., and Ku·V/kT indicating the thermal fluctuation properties was 100 and deteriorated as compared with Example 11.

EXAMPLE 12 AND COMPARATIVE EXAMPLE 12

The magnetic disks were formed in the similar manner as in Example 11 and Comparative Example 11 except that the film thickness of the magnetic layer 5 in Example 11 and Comparative Example 11 was changed to 180 angstroms or less.

When the coercive force, S/N ratio, PW50, properties of output decay, and Ku·v/kT of the magnetic disk were measured, the following results were obtained.

TABLE 3

| | Coercive force (Oe) | S/N ratio (dB) | PW50 (nsec) | Signal attenuation dB/decade | Heat fluctuation properties Ku · v/kT |
|---|---|---|---|---|---|
| Example 12 | 2650 | 30.9 | 17.9 | −0.058 | 98 |
| Comparative Example 12 | 2450 | 30.5 | 18.4 | −0.077 | 80 |

As shown in Table 3, the influence of the thermal fluctuation becomes remarkable as the film thickness of the magnetic layer decreases, and a difference of the output signal attenuation (−dB/decade) increases between Example 12 in which the divided seed layer 2 of Example 11 is used and Comparative Example 12 in which the single-layer seed layer of Comparative Example 11 is used.

Figure 6:
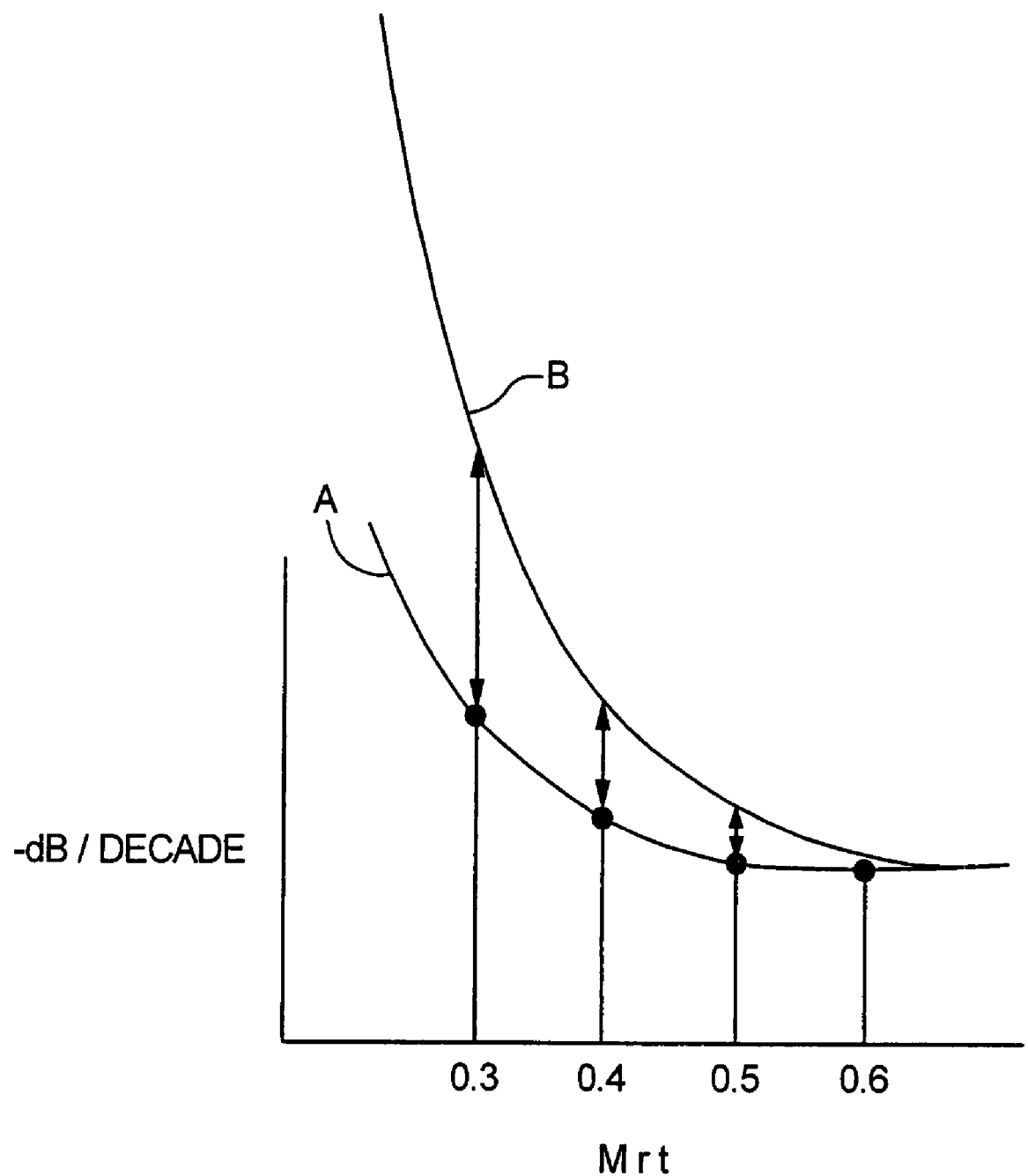
FIG. 6 is an explanatory view showing a relation between the film thickness of a magnetic layer and the influence of thermal fluctuation.

As shown in FIG. 6, when the film thickness t of the magnetic layer (Mr denotes the residual magnetization) (Mrt=around 0.5 to 0.6) (in Example 11 and Comparative Example 11), the output signal attenuation (−dB/decade) has little difference by the difference of the seed layer. However, when the film thickness of the magnetic layer decreases (Mrt=around 0.4 to 0.3), the difference of the output signal attenuation (−dB/decade) increases between the case in which the divided seed layer is used (curve A) and the case in which the single seed layer is used (curve B), and the influence of thermal fluctuation becomes remarkable.

Moreover, usually in the fine division of the magnetic particles, the value of Ku·v/kT is reduced, but in the present invention the particle diameter distribution of the magnetic particles is narrow and there is little number of excessively fine particles susceptible to the influence of thermal fluctuation. Therefore, even when the magnetic particles are finely divided, the value of Ku·v/kT is not reduced, and the thermal fluctuation resistance is satisfactory.

EXAMPLE 13

The magnetic disk was formed in the similar manner as Example 11 except that the magnetic layer 5 of Example 11 was formed of a first magnetic layer 51, a separating layer 52, and a second magnetic layer 53 and the protective layer 8 was formed of a first protective layer 81, and a second protective layer 82.

Additionally, the first and second magnetic layers 51 and 53 are formed of the same material of a CoCrPtTa alloy, and both have a film thickness of 120 angstroms. For the contents of Co, Cr, Pt, Ta of the magnetic layers, the first magnetic layer comprises Co: 72.5 at %, Cr: 16 at %, Pt: 8 at %, Ta: 3.5 at %, and the second magnetic layer comprises Co: 71 at %, Cr: 18 at %, Pt: 8 at %, Ta: 3 at %.

Moreover, the separating layer 52 interposed between the first magnetic layer 51 and the second magnetic layer 53 is a CrMnC thin film (film thickness: 30 angstroms) of a nonmagnetic material, and the composition ratio is Cr: 97.95 at %, Mn: 2.00 at %, C: 0.05 at %.

Furthermore, the first protective layer 81 comprises a Cr film with a film thickness of 50 angstroms, and plays a role of a chemical protective film for preventing the magnetic properties of the magnetic layer from being deteriorated by oxidation. The second protective layer 82 is a hydrocarbon film with a film thickness of 100 angstroms.

When the coercive force, S/N ratio, PW50, properties of output decay, Ku·v/kT of the magnetic disk were measured, the coercive force was 2580 Oe, the S/N ratio was 30.7 dB, PW50 was 19.1 nsec, and satisfactory results were obtained. Moreover, the output signal attenuation was −0.08 dB/decade at 100 Kfci, 60° C., and the Ku·v/kT indicating the thermal fluctuation properties was also satisfactory at 90. Additionally, since the magnetic layer 5 is divided and the particle diameter of the magnetic particle is reduced in Example 13, the influence of thermal fluctuation is easily exerted as compared with the magnetic recording medium of Example 11.

COMPARATIVE EXAMPLE 13

The magnetic disk was formed in the similar manner as Example 13 except that the seed layer 2 of Example 13 was formed of a single-layer NiAl thin film (Ni: 50 at %, Al: 50 at %) with a film thickness of 600 angstroms.

When the coercive force, S/N ratio, PW50, properties of output decay, Ku·v/kT of the magnetic disk were measured, the coercive force was 2580 Oe, the S/N ratio was 30.6 dB, PW50 was 19.6 nsec, the output signal attenuation was −0.10 dB/decade, and Ku·v/kT was 80.

EXAMPLES 14 TO 17, COMPARATIVE EXAMPLES 14 AND 15

The magnetic disks were formed in the similar manner as Example 11 except that the film thickness of the alloy films 21, 23 constituting the seed layer 2 of Example 11 was changed to 90 angstroms (Comparative Example 14), 100 angstroms (Example 14), 250 angstroms (Example 15), 450 angstroms (Example 16), 550 angstroms (Example 17), and 600 angstroms (Comparative Example 15). The coercive force, S/N ratio, PW50, properties of output decay, Ku·v/kT of the magnetic disks were as follows.

TABLE 4

|  | Each film thick. (A) | Total film thick. (A) | Coer. force (Oe) | S/N ratio (dB) | PW50 (nsec) | Signal atten. dB/ decade | Heat fluctu. proper. Ku · v/kT |
|---|---|---|---|---|---|---|---|
| Ex. 14 | 100 | 200 | 2536 | 29.3 | 18.7 | −0.055 | 105 |
| Ex. 15 | 250 | 500 | 2800 | 29.44 | 18.77 | −0.050 | 110 |
| Ex. 16 | 450 | 900 | 3567 | 29.45 | 18.2 | −0.048 | 113 |
| Ex. 17 | 550 | 1100 | 3542 | 28.9 | 18.0 | −0.045 | 115 |
| Compar. Ex. 14 | 90 | 180 | 2214 | 28.7 | 19.1 | −0.080 | 85 |
| Compar. Ex. 15 | 600 | 1200 | 3502 | 28.6 | 17.9 | −0.046 | 115 |

As shown in Table 4, the film thickness of the alloy films 21, 23 constituting the seed layer 2 is preferably in a range of 100 to 550 angstroms in view of the coercive force, S/N ratio (noise), PW50 magnetic properties, properties of output decay, and thermal fluctuation properties (Ku·v/kT).

EXAMPLES 18 TO 20, COMPARATIVE EXAMPLES 16 and 17

The magnetic disks were formed in the similar manner as Example 11 except that the intermediate layer 22 in Example 11 was CrMo (Mo: 10 at %), and the film thickness of this intermediate layer 22 was changed to 4 angstroms (Comparative Example 16), 5 angstroms (Example 18), 15 angstroms (Example 19), 50 angstroms (Example 20), and 60 angstroms (Comparative Example 17)

The coercive force, S/N ratio, PW50, properties of output decay, Ku·v/kT of the magnetic disks were as follows.

TABLE 5

|  | Film thickness (angstrom) | Coer. force (Oe) | S/N ratio (dB) | PW50 (nsec) | Signal attenua. dB/decade | Heat fluctu. proper. Ku · v/kT |
|---|---|---|---|---|---|---|
| Ex. 18 | 5 | 2750 | 29.23 | 19.08 | −0.055 | 105 |
| Ex. 19 | 15 | 2800 | 29.43 | 18.78 | −0.050 | 110 |
| Ex. 20 | 50 | 2850 | 29.2 | 18.6 | −0.045 | 115 |
| Compar. Ex. 16 | 4 | 2700 | 28.8 | 19.38 | −0.060 | 100 |
| Compar. Ex. 17 | 60 | 2880 | 28.8 | 18.6 | −0.045 | 118 |

As shown in Table 5, the film thickness of the intermediate layer 22 is preferably in a range of 5 to 50 angstroms in view of the coercive force, S/N ratio, PW50, properties of output decay, and thermal fluctuation properties (Ku·v/kT).

Additionally, the intermediate layer 22 (CrW (W: 10 at %)) in Example 11 was also subjected to the similar experiment, and the coercive force, S/N ratio, and PW50 indicated satisfactory values in the range of 5 to 50 angstroms. The alloy was different from the CrMo alloy in that the values were constant, the coercive force: 2820 Oe, noise: 29.3 dB, PW50: 18.6 nsec in the range of 5 to 50 angstroms. This is supposedly because the CrW alloy is a material whose crystal growth properties are not easily changed with respect to the film thickness change with the seed layer as compared with other Cr alloys such as CrMo alloy. Specifically, there is little dispersion in the magnetic properties and the productivity is stable.

EXAMPLES 21 TO 26

The magnetic disks were formed in the similar manner as Example 11 except that the film material of the alloy films 21, 23 constituting the seed layer 2 of the example was changed to NiAlRu (Ni: 45 at %, Al: 50 at %, Ru: 5 at %) (Example 21), CrTi (Cr: 80 at %, Ti: 20 at %) (Example 22), CrNi (Cr: 60 at %, Ni: 40 at %) (Example 23), FeAl (Fe: 50 at %, Al: 50 at %) (Example 24), NiAlW (Ni: 50 at %, Al: 45 at %, W: 5 at %) (Example 25), and NiAlNb (Ni: 50 at %, Al: 45 at %, Nd: 5 at %) (Example 26).

The coercive force, S/N ratio, PW50, properties of output decay, and Ku·v/kT of the magnetic disks were as follows.

TABLE 6

|  | Film material | Coercive force (Oe) | S/N ratio (dB) | PW50 (nsec) | Signal attenua. dB/decade | Heat fluctu. proper. Ku · v/kT |
|---|---|---|---|---|---|---|
| Ex. 21 | NiAlRu | 2850 | 29.2 | 18.97 | −0.050 | 110 |
| Ex. 22 | CrTi | 2700 | 29.7 | 18.8 | −0.055 | 105 |
| Ex. 23 | CrNi | 3300 | 29.2 | 18.5 | −0.050 | 112 |
| Ex. 24 | FeAl | 2600 | 28.8 | 19.0 | −0.050 | 110 |
| Ex. 25 | NiAlW | 3200 | 29.0 | 19.1 | −0.060 | 103 |
| Ex. 26 | NiAlNd | 3100 | 29.2 | 19.2 | −0.062 | 100 |

As shown in Table 6, it is seen that for the film materials of the alloy films 21, 23, NiAlRu, CrTi, CrNi are particularly preferable among the materials shown in Table 6 in view of the coercive force, noise, PW50 magnetic properties, properties of output decay, and thermal fluctuation properties (Ku·v/kT).

EXAMPLES 27 TO 29

In the similar manner as Example 11, 100 pieces of each magnetic disk were formed except that the film material of the intermediate layer 22 in Example 11 was changed to CrMo (Cr: 90 at %, Mo: 10 at %) (Example 27), CrV (Cr: 80 at %, V: 20 at %) (Example 28), and CrTa (Cr: 95 at %, Ta: 5 at %) (Example 29).

The coercive force, S/N ratio, PW50, properties of output decay, and Ku·v/kT of the magnetic disks were as follows.

TABLE 7

|  | Film Mate. | Coercive force (Oe) | S/N ratio (dB) | PW50 (nsec) | Signal attenua. dB/decade | Heat fluctu. proper. Ku · v/kT |
|---|---|---|---|---|---|---|
| Ex. 27 | CrMo | 2750 to 2850 | 29.1 to 29.5 | 18.4 to 19.2 | −0.040 to −0.055 | 100 to 115 |
| Ex. 28 | CrV | 2750 to 2850 | 29.2 to 29.8 | 18.4 to 19.2 | −0.040 to −0.055 | 100 to 115 |
| Ex. 29 | CrTa | 2700 to 2870 | 28.5 to 29.3 | 18.8 to 19.4 | −0.040 to −0.060 | 100 to 120 |
| Ex. 11 | CrW | 2780 to 2850 | 29.2 to 29.4 | 18.4 to 18.8 | −0.045 to −0.055 | 105 to 115 |

As shown in Table 7, when the film material of the intermediate layer 22 is CrW, there is little dispersion in magnetic properties and the productivity is also preferably stable. This is because CrW has a good lattice matching with the seed layer as compared with the Cr alloy films such as CrMo, and the CrW film thickness change causes little change of properties.

A thermal stability measuring apparatus according to the embodiment of the present invention will next be described.

Figure 7:
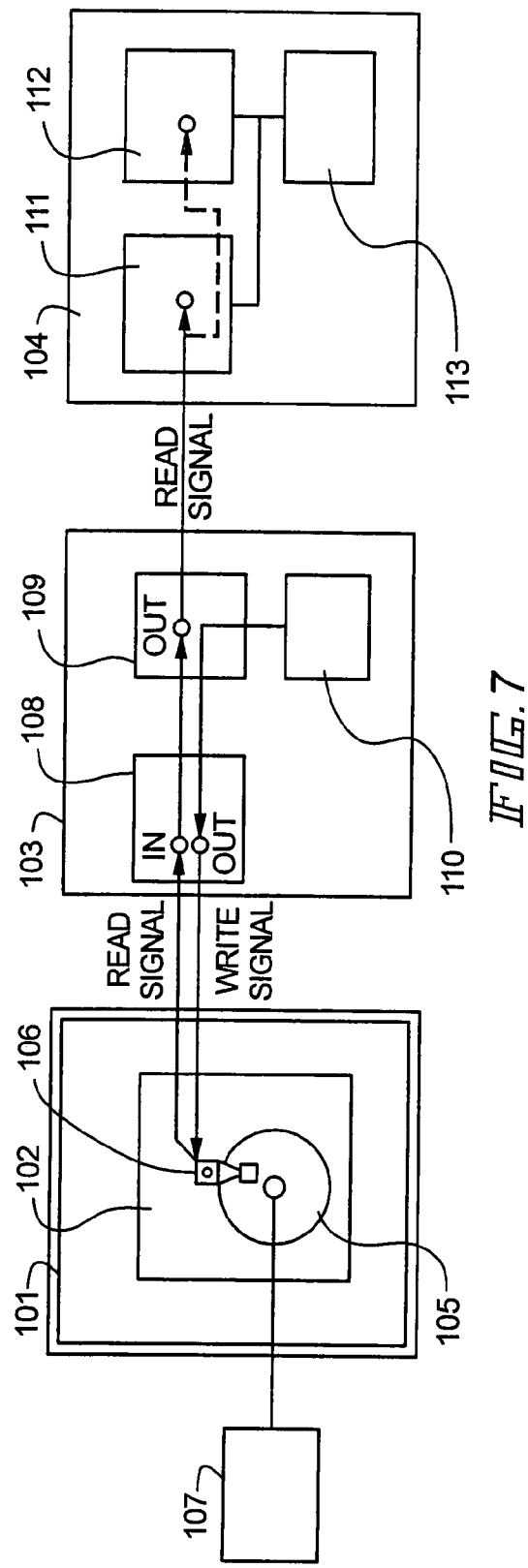
FIG. 7 is an explanatory view showing the entire constitution of a thermal stability measuring apparatus of the present invention.
Figure 8:
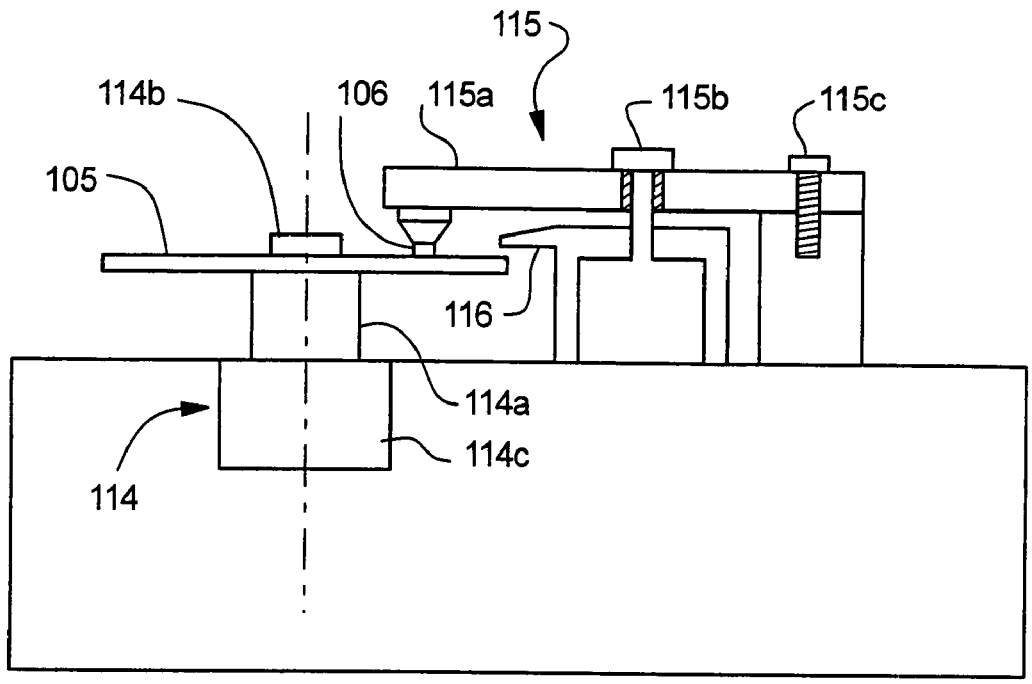
FIG. 8 is a partial sectional view of a head/disk mechanism section.
Figure 9:
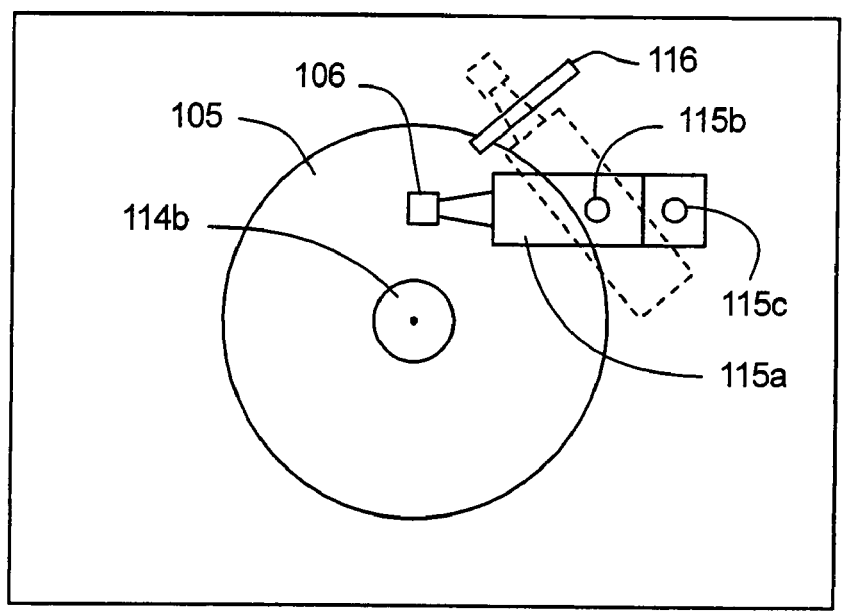
FIG. 9 is a plan view of the head/disk mechanism section.

FIGS. 7, 8, and 9 are explanatory views of the thermal stability measuring apparatus according to the embodiment of the present invention.

FIG. 7 is a schematic view of the thermal stability measuring apparatus (the entire system). In FIG. 7, a head/disk mechanism section 102 includes a magnetic disk 105 which is a magnetic recording medium, a magnetoresistive head (MR head) 106 which is a magnetic head, a mechanism for rotating the disk, and a mechanism for loading a head slider onto the disk. A motor drive circuit 107 is a control circuit for driving a motor 114c of the head/disk mechanism section 102. Moreover, the head/disk mechanism section 102 is usually contained in an environmental tank 101 which is controllable in temperature in order to expose the magnetic disk 105 under a high-temperature environment.

A read/write circuit section 103 includes a function of feeding a write signal to the MR head 106 of the head/disk mechanism section 102 to write the signal to the magnetic disk 105, and a function of amplifying the signal read by the MR head 106 for analysis. Specifically, the write signal for writing the signal onto the magnetic disk 105 is generated in a pattern signal generator 110, and fed to the write element of the MR head 106 via a preamplifier 109 and a head amplifier 108. A slight read signal read by the read element of the MR head 106 is amplified through the head amplifier 108 and the preamplifier 109, and fed to a signal evaluating section 104.

The signal evaluating section 104 has a function of measuring and evaluating the read signal amplified by the read/write circuit section 103, and comprises a spectrum analyzer 111, an oscilloscope 112, and a personal computer 113 for controlling the measuring units and processing data.

FIGS. 8 and 9 are explanatory views of the head/disk mechanism section.

In FIG. 8, the magnetic disk 105 is held by a clamp 114b on a disk rotating spindle 114a of a rotating apparatus 114, and rotated by driving the motor 114c which uses the disk rotating spindle 114a as a rotating shaft. Moreover, an arm mechanism 115 loads or unloads the MR head 106 on the magnetic disk 105. The MR head 106 is fixed to an arm 115a. The arm 115a is attached to a rotating shaft 115b, and can rotate about this rotating shaft 115b.

As shown in FIGS. 9 and 8, in the usual use, when the magnetic disk 105 does not rotate, the MR head 106 is held by a ramp section 116. After driving the motor 114c to rotate the magnetic disk 105, the arm 115a is rotated about the rotating shaft 115b, and the MR head 106 is loaded on the magnetic disk 105 from the ramp section 116. A fixing screw 115c fixes the arm 115a, so that the position of the MR head 106 is always fixed in a predetermined radial position on the magnetic disk 105.

Figure 10:
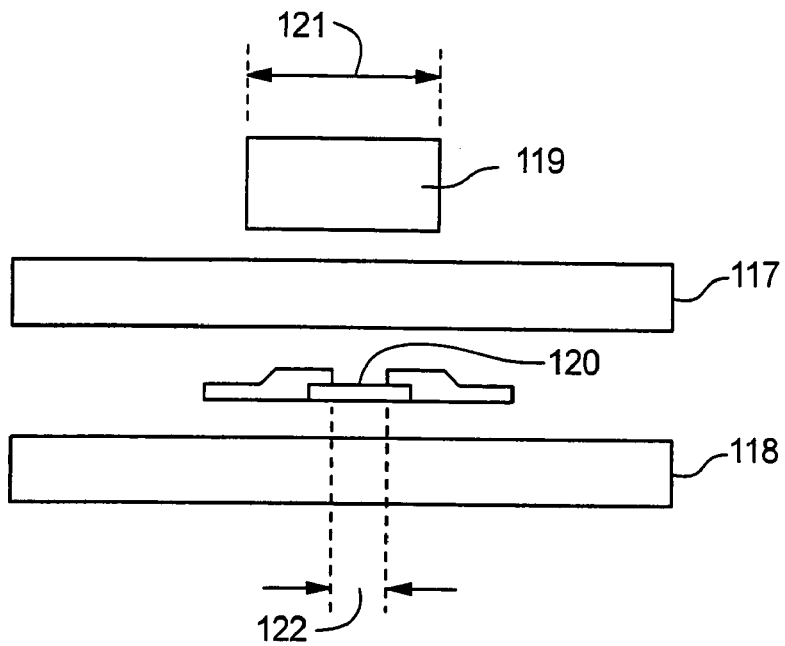
FIG. 10 is a front view showing the read/write element structure of a usual MR head.

FIG. 10 shows the read/write element structure of the usual MR head. The MR head used in the present apparatus comprises the read/write element whose write track width 121 is twice or more a read track width 122. Therefore, it is possible to accurately measure and evaluate only the signal attenuation by the thermal fluctuation of the magnetic recording medium without being influenced by the thermal off-track. Additionally, numeral 117 denotes an upper shield, 118 denotes a lower shield, 119 denotes a write element, and 120 denotes a read element.

A thermal stability measuring method according to one embodiment of the present invention will next be described.

First, as shown in FIGS. 8 and 9, the magnetic disk 105 and MR head 106 are mounted on the head/disk mechanism section. Subsequently, after driving the motor 114c of FIG. 8 to rotate the magnetic disk 105, the arm 115a is rotated, and the MR head 106 is manually loaded onto the magnetic disk 105 from the ramp section 116. Furthermore, the arm 115a is fixed by the fixing screw 115c. In this case, the MR head 106 floats up and runs above the main surface of the magnetic disk. In this state, the head/disk mechanism section is placed into the environmental tank 101 of FIG. 7. After the inside of the environmental tank 101 is stabilized at the preset temperature, the read/write circuit section 103 feeds the write signal to the write element of the MR head 106, and writes the signal to the magnetic disk 105. Subsequently, immediately after the signal is written, the signal written to the magnetic disk 105 is read via the read element of the MR head 106, amplified in the read/write circuit section 103, and measured in the signal evaluating section 104. The signal evaluating section 104 records the amplitude value of the read signal at the constant time interval.

The results of measurement and evaluation of the signal attenuation of a plurality of magnetic recording media (samples A, B, C) supposedly different from one another in thermal fluctuation properties by the above-described method will next be described.

Figure 11:
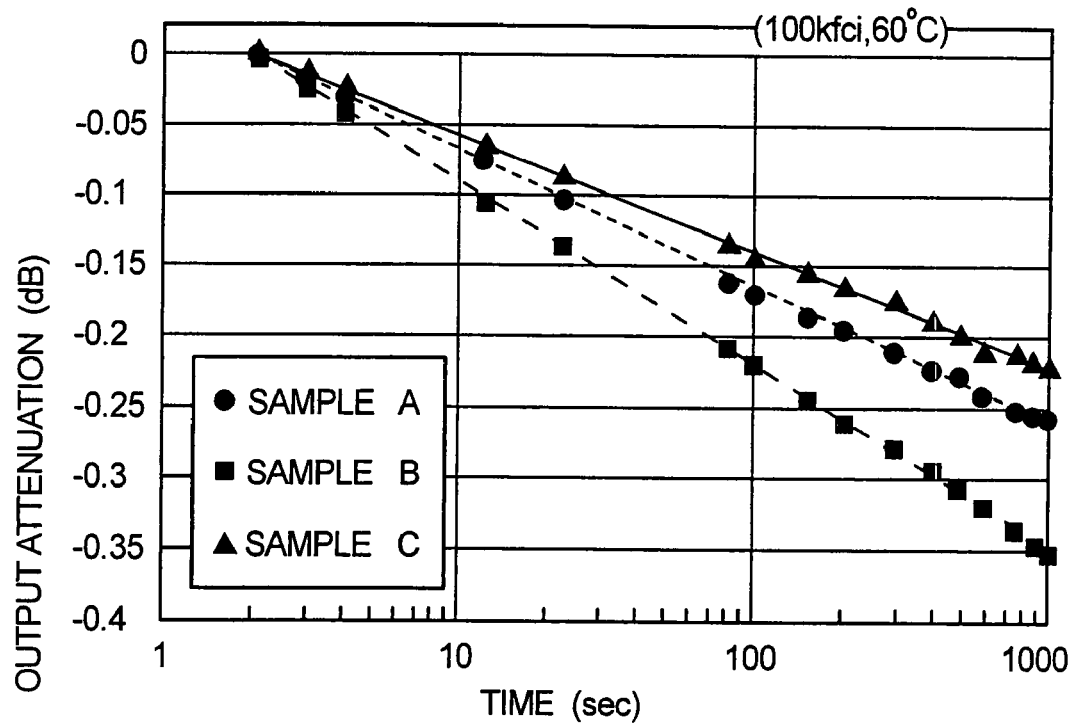
FIG. 11 is a graph showing the result of signal attenuation measured by using the predetermined MR head of the present invention.

FIG. 11 shows the results of the measurement in which the spectrum analyzer is used as the signal evaluating section.

For the measurement conditions, the temperature of the environmental tank is 60° C., and the recording density of the signal written to the magnetic disk is 100 KFlux/inch.

Moreover, the head used in the measurement is an MR head (the MR head including the read/write element whose read track width is 0.5 times as large as the write track width) which has a write track width of 12.0 μm, a read track width of 2.4 μm, a write gap length of 0.35 μm, a read gap length of 0.30 μm, and a read/write element part float-up amount of 20 nm.

The abscissa of the graph of FIG. 11 shows the elapse of time immediately after the signal is written to the magnetic disk. Moreover, the ordinate shows the power (output) attenuation of the basic wave of the read signal. When the abscissa is represented with logarithms, a linear signal attenuation is usually generated as shown in FIG. 11. Moreover, FIG. 12 shows the inclination of the straight line of the graph of FIG. 11 in numeric values, and can be utilized as the index which indicates the signal attenuation by the thermal fluctuation.

Moreover, the measurement similar to the above-described measurement was performed using the head similar to the MR head used in the above-described measurement except that the MR head had a write track width of 5.0 μm (in the read/write element of the MR head, the read track width was 2.1 times as large as the write track width). As a result, the linear signal attenuation occurred as shown in FIG. 11, and only the signal attenuation by the thermal fluctuation of the magnetic recording medium could accurately be measured and evaluated.

Figures 12, 13:
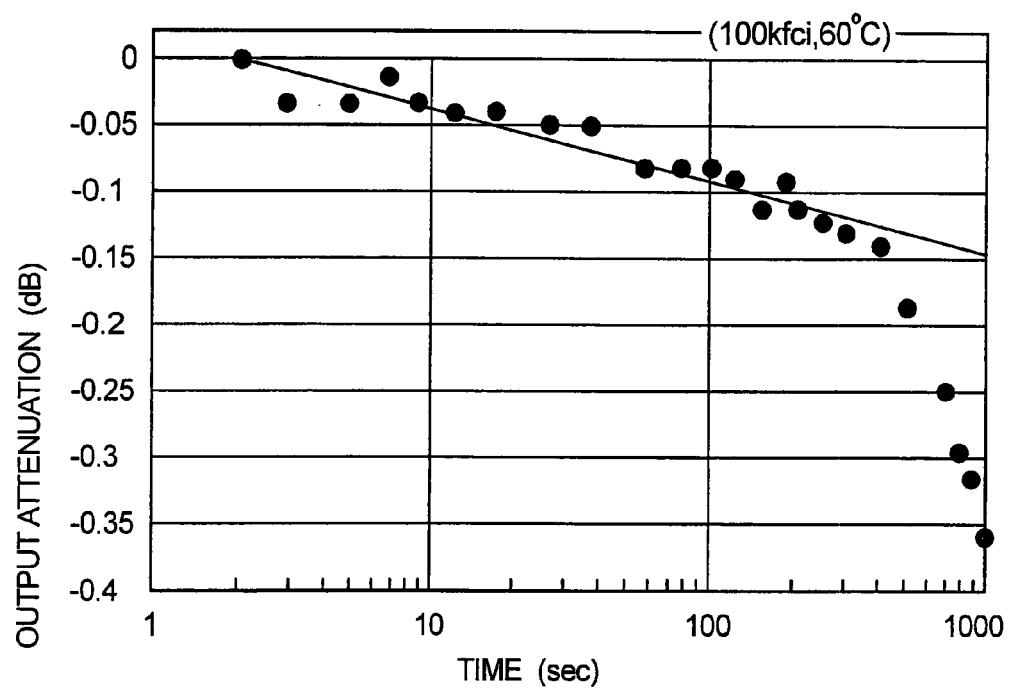
FIG. 12 is a diagram showing the straight line inclination of the graph of FIG. 11.
FIG. 13 is a graph showing the result of the signal attenuation measured by using the usual MR head.

FIG. 13 shows the results of the measurement in which the usual MR head mounted on a magnetic disk drive was used. The specification of the head is the same as that of the MR head used in the above-described measurement except that the write track width is 3.0 μm (the MR head including the read/write element whose read track width is 1.25 times as large as the write track width). Moreover, the measurement conditions are the same as those of the above-described measurement. In this measurement, when 400 seconds are exceeded, a rapid signal attenuation by the thermal off-track is found, but the steadily linear signal attenuation occurs in the above-described measurement. Moreover, it is seen in FIG. 13 that there is a large dispersion of a measurement point, and the stability of the measurement is deteriorated by the thermal off-track. Additionally, when the measurement was similarly performed using another usually used MR head (write track width of about 1.5 μm, read track width of about 1.0 μm), further rapid signal attenuation and measurement dispersion by the thermal off-track were found.

It has been proved from the above-described results that in the present embodiment, only the signal attenuation by the thermal fluctuation of the magnetic recording medium is accurately measured and evaluated.

Additionally, the conventional spin stand type electromagnetic conversion property evaluating apparatus (for 2.5 inches, single plate) has an outer dimension of 1 m×1 m×50 cm and it was difficult to place the apparatus in the high-temperature tank and conduct the test, but the thermal stability measuring apparatus of the present invention shown in FIGS. 7 to 9 has an outer dimension of about 20 cm×10 cm×4 cm and the test could easily and inexpensively be performed by placing the apparatus in the high-temperature tank.

As described above, according to the present invention, without attaching the disk to the magnetic disk drive before writing the tracking signal or the like, the signal attenuation by the thermal fluctuation can easily be measured on the side of a magnetic disk maker. Therefore, based on the signal attenuation of FIGS. 11 and 12 obtained by the measuring method and apparatus of the present invention, the thermal fluctuation properties of the magnetic recording medium can be evaluated, and the magnetic recording medium having satisfactory thermal fluctuation properties can be selected. For example, in FIG. 12, the sample C with an output attenuation of 0.09 or less is selected so that the magnetic disk provided with satisfactory thermal fluctuation properties can be obtained.

In the present invention, the head arm is preferably formed of a material which is not easily thermally expanded. From the standpoint of the thermal expansion coefficient and processability, aluminum, stainless (SUS), and the like are preferable.

Moreover, the fixed position of the head arm is not particularly limited, but the arm is preferably fixed in the vicinity of the middle between the disk inner periphery and outer periphery. Additionally, in order to perform comparison/evaluation among the disks on the same conditions by using the same recording density and the same head float-up height, the head arm fixed position is preferably constant among the disks.

The means for fixing the head arm is not limited to the fixing screw, and any means can be used as long as the head arm can securely be fixed.

The mechanism can also be constituted such that two disk rotating apparatuses are arranged, the head is attached to both ends of the arm 115a, and two disks are simultaneously measured with one arm, and it is also easy to construct a mechanism for simultaneously measuring a plurality of disks.

Moreover, the magnetic head used in the evaluating method and apparatus of the present invention is not limited to the above-described head, and a gigantic (large) magnetoresistive (GMR) head, a dual stripe magnetoresistive (DSMR) head, and a contact type head in which a pad is formed on the surface opposite to the magnetic disk of the magnetic head can also be used.

Furthermore, in the above-described embodiment, the measurement/evaluation of the thermal fluctuation has been described, but this is not limited, and the evaluating method and apparatus of the present invention can also be utilized in the measurement/evaluation of the temperature properties of the electromagnetic properties between the magnetic head and the magnetic recording medium, and the like.

What is claimed is:

1. A thermal stability measuring method of a magnetic recording medium, the method comprising the steps of:
    disposing the magnetic recording medium constituted by forming at least a magnetic layer on a substrate, and a magnetic head comprising a read/write element provided with a read element and a write element fixed to one end of a head support member on the main surface of the magnetic recording medium under an atmosphere heated to a predetermined temperature;
    relatively moving said magnetic head with respect to said main surface, and writing a signal to a predetermined track position on said magnetic layer by said write element; and
    detecting the write signal written to said track by said read element, and comparing said write signal with said detected signal to calculate the signal attenuation of the magnetic recording medium to measure the thermal stability of the magnetic recording medium, wherein:
    the write track width of said write element is set to be larger than the total of the track width of a radial direction of said track position on said magnetic layer, and the movement amount of said track position in the radial direction by thermal expansion caused by heating said head support member.

2. A thermal stability measuring method of a magnetic recording medium, the method comprising the steps of:
    preparing the magnetic recording medium constituted by forming at least a magnetic layer on a substrate;
    rotating said magnetic recording medium to dispose a magnetic head on the main surface of the magnetic recording medium, the magnetic head comprising a read/write element which is opposite to the main surface of the magnetic recording medium and whose write track width is twice or more as large as a read track width, and relatively moving said magnetic head on said main surface with respect to said main surface;
    disposing said magnetic recording medium and said magnetic head under an atmosphere heated to a predetermined temperature;
    writing a signal to the magnetic layer of said magnetic recording medium by the read/write element of said magnetic head;
    detecting the write signal written to said magnetic layer by the read/write element of the magnetic head; and
    comparing said write signal with said detected signal to calculate the signal attenuation of the magnetic recording medium.

3. A thermal stability measuring method of a magnetic recording medium, the method comprising the steps of:
    preparing a magnetic recording medium constituted by forming at least a magnetic layer on a substrate;
    rotating said magnetic recording medium to dispose/fix a magnetic head on the main surface of the magnetic recording medium, the magnetic head comprising a read/write element which is opposite to the main surface of the magnetic recording medium and whose write track width is twice or more as large as a read track width, and relatively moving said magnetic head on said main surface with respect to said main surface;
    disposing said magnetic recording medium and said magnetic head under an atmosphere heated to a predetermined temperature;
    writing a signal to the magnetic layer of said magnetic recording medium by the read/write element of said magnetic head;
    detecting the write signal written to said magnetic layer by the read/write element of the magnetic head; and
    comparing said write signal with said detected signal to calculate the signal attenuation of the magnetic recording medium.

* * * * *